(12) United States Patent
Becker et al.

(10) Patent No.: US 6,914,340 B2
(45) Date of Patent: Jul. 5, 2005

(54) HANDHELD GENERATOR

(75) Inventors: Pierre Becker, London (GB); John Edward Hutchinson, London (GB)

(73) Assignee: Freeplay Market Development, London (GB)

( * ) Notice: Subject to any disclaimer, the term of this patent is extended or adjusted under 35 U.S.C. 154(b) by 0 days.

(21) Appl. No.: 10/451,120
(22) PCT Filed: Dec. 24, 2001
(86) PCT No.: PCT/GB01/05778
§ 371 (c)(1),
(2), (4) Date: Dec. 12, 2003
(87) PCT Pub. No.: WO02/052692
PCT Pub. Date: Jul. 4, 2002

(65) Prior Publication Data
US 2004/0090210 A1 May 13, 2004

(30) Foreign Application Priority Data
Dec. 22, 2000 (GB) .............................................. 0031639
Oct. 3, 2001 (GB) .............................................. 0123745
Oct. 3, 2001 (GB) .............................................. 0123746

(51) Int. Cl.$^7$ ................................................. H02K 7/18
(52) U.S. Cl. ...................................... 290/1 R; 290/1 C
(58) Field of Search ................................. 290/1 R, 1 C

(56) References Cited

U.S. PATENT DOCUMENTS

| 2,620,682 | A | | 12/1952 | Perrot ........................... 74/547 |
| 4,360,860 | A | | 11/1982 | Johnson et al. .............. 362/192 |
| 4,701,835 | A | | 10/1987 | Campagnuolo et al. ...... 362/192 |
| 5,998,975 | A | | 12/1999 | Tada et al. ....................... 322/7 |
| 6,034,492 | A | * | 3/2000 | Saito et al. ................... 318/141 |
| 6,288,463 | B1 | | 9/2001 | Tada et al. ................. 310/75 B |

FOREIGN PATENT DOCUMENTS

| DE | 295 20 719 U1 | 4/1996 | ............. H02J/7/32 |
| DE | 200 08 135 U1 | 9/2000 | ............. H02K/7/18 |
| DE | 199 55 492 A1 | 5/2001 | .......... H04M/19/08 |

(Continued)

OTHER PUBLICATIONS

Great Britain Search Report dated Jun. 22, 2001, 1 page.
Great Britain Search Report dated Feb. 4, 2002, 1 page.
Great Britain Search Report, dated May 15, 2002, 1 page.
English Abstract of Publication No. DE20008135U, Publication Date Sep. 7, 2000, 1 page.
English Abstract for Published Application No. DE19955492 A, Publication Date May 31, 2001, 2 pages.
English Abstract for Published Application No. JP11288742 A, Publication Date Oct. 19, 1999, 2 pages.
English Abstract of Published Application No. JP11252884 A, Publication Date Sep. 17, 1999, 2 pages.

*Primary Examiner*—Joseph Waks
(74) *Attorney, Agent, or Firm*—Osha & May L.L.P.

(57) ABSTRACT

The invention concerns a handheld power generator for generating electrical power for a consumer device, the generator comprising a main casing housing an input gear for driving an alternator via at least one intermediate gear so as to provide a step-up drive ratio in the range of 10:50; the input gear, the or each intermediate gear, and the rotor of the alternator all having their rotational axes perpendicular to the base of the main casing so that the gears and rotor rotate parallel to the plane of the base; a rectifier circuit for rectifying the alternator output; means for mounting a storage device for storing the output of the alternator, a control circuit for modifying the rectifier output to a voltage/current appropriate for the consumer device, and wherein the input gear is connected to a drive member rotatable by manual action to rotate the input gear in turn, the axis of the drive member being parallel to the respective axes of the input gear, the or each intermediate gear and the rotor with all the axes lying in a single straight line.

11 Claims, 22 Drawing Sheets

FOREIGN PATENT DOCUMENTS

| | | | | |
|---|---|---|---|---|
| GB | 596297 | 1/1948 | | |
| GB | 1 421 804 | 1/1976 | ............ | H02K/7/00 |
| GB | 2 302 067 A | 1/1997 | ............ | F02N/3/02 |
| GB | 2 332 268 A | 6/1999 | ........... | F21L/13/06 |
| GB | 2 353 854 A | 3/2001 | ........... | F21L/13/08 |
| JP | 11122869 A * | 4/1999 | ........... | H02K/7/18 |
| JP | 11-252884 | 9/1999 | ........... | H02K/29/00 |
| JP | 11-288742 | 10/1999 | .......... | H01M/10/46 |
| WO | WO 98/06162 | 2/1998 | ............ | H02K/7/18 |
| WO | WO 98/16989 | 4/1998 | ............ | H02K/7/18 |
| WO | WO 01/03269 A1 * | 1/2001 | | |
| WO | WO 01/29952 A1 | 4/2001 | ............. | H02J/7/32 |
| WO | WO 01/31764 A1 | 5/2001 | ............ | H02K/7/18 |

* cited by examiner

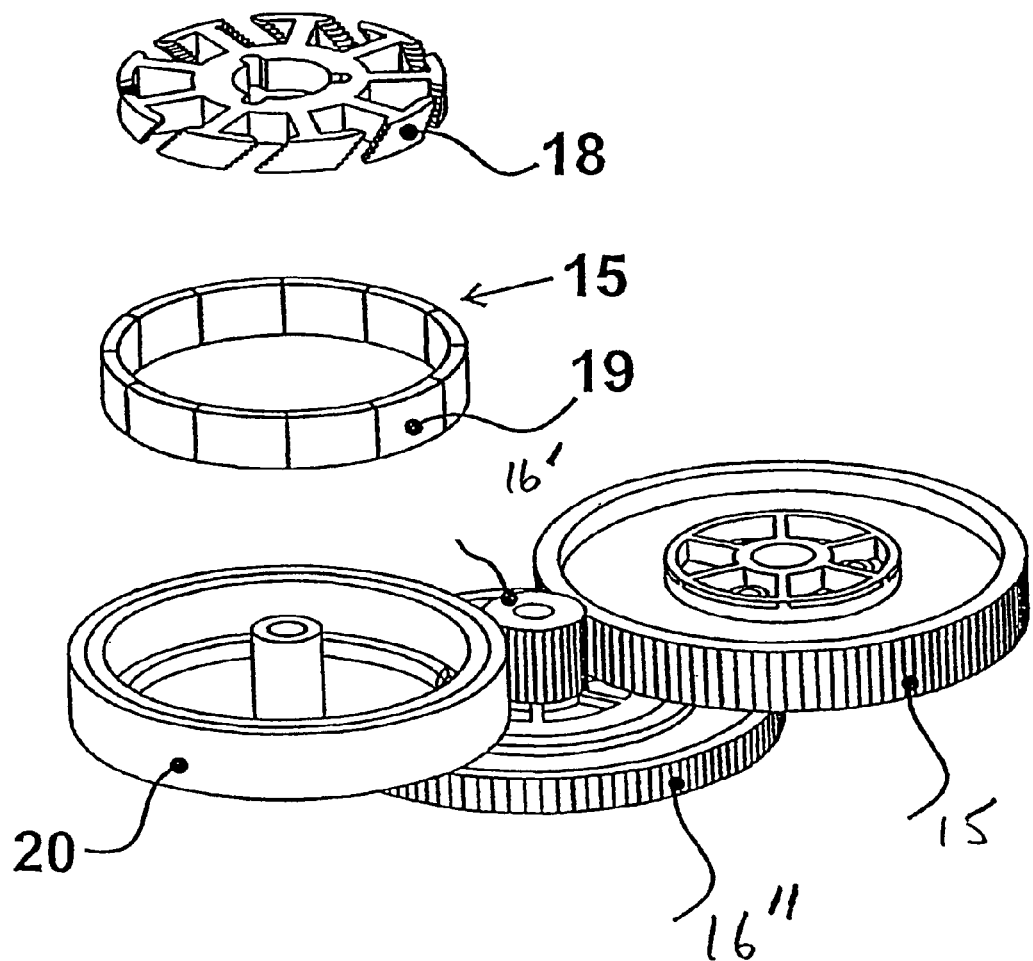

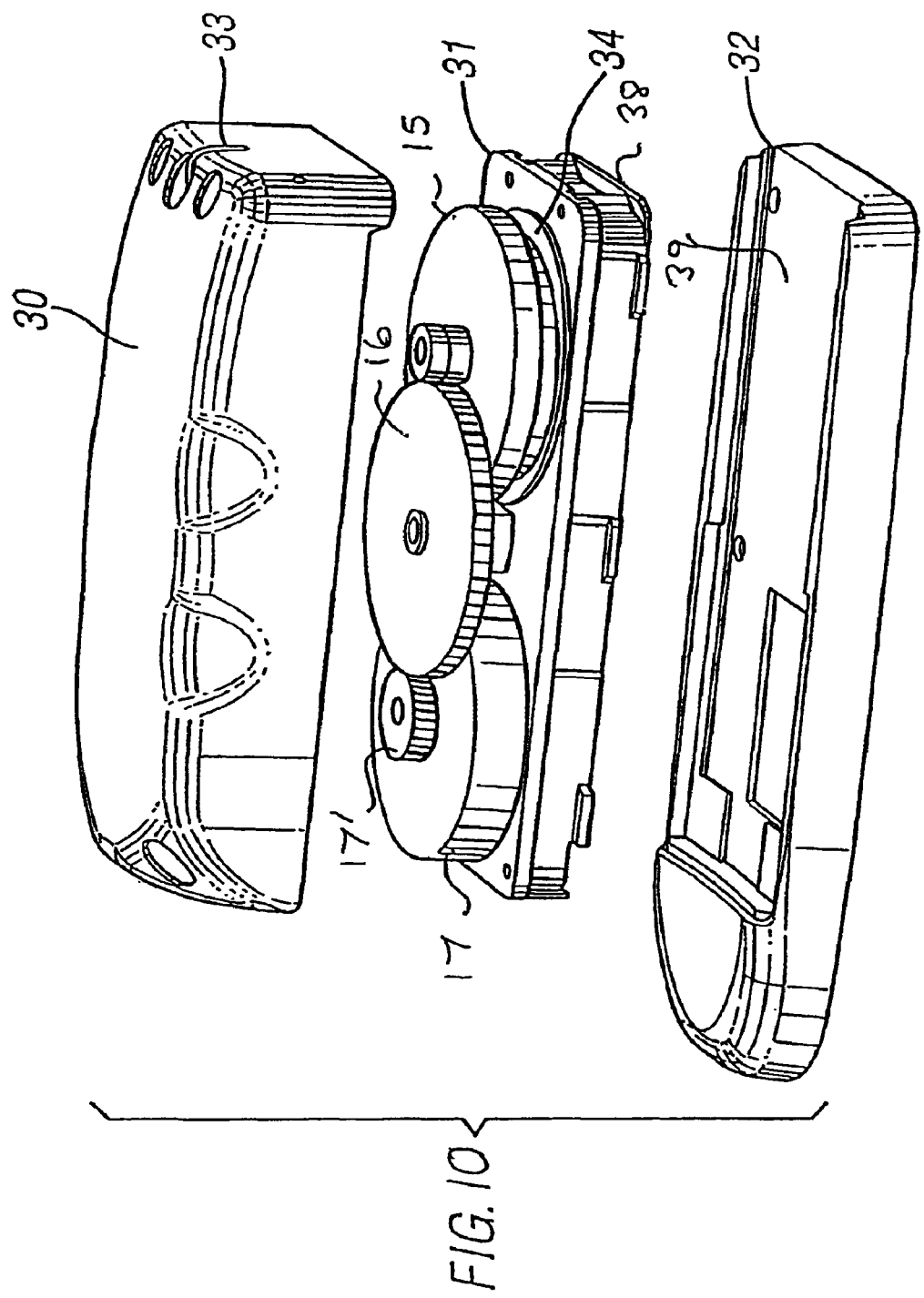

HANDHELD GENERATOR

The present invention is concerned with devices by means of which electrical energy can be generated manually. Such devices are already in use in radios but can also find application in cellphones, cordless telephones, two-way radios, PDA's, palm top devices, notebook computers, laptop computers, navigation devices such as GPS receivers, radios, torches, small lanterns, cassette players, CD players, MP3 devices, electronic game devices, fully or partially electrically powered models such as aircraft and cars, emergency equipment such as locator beacons or communication devices, and any other equipment normally using electrical power from batteries.

Such devices can be used to charge the batteries of electronic equipment and also can enable equipment to be used without dedicated batteries. Accordingly a device according to the present invention can be used in a number of ways: firstly, as a replacement for a consumer's standard battery or batteries by using an external power plug on the consumer's device. Secondly, as a replacement for the consumer's standard battery or batteries in which case the device according to the present invention could be a clip-on device. Thirdly, to charge the battery or batteries of the consumer's equipment through the consumer's charging plug or through the consumer's external power plug if the consumer allows this. Fourthly, to supplement the consumer's battery either through the consumer's charging plug or through the consumer's external power plug.

In accordance with the present invention there is provided a handheld power generator for generating electrical power for a consumer device, the generator comprising a main casing housing an input gear for driving an alternator via at least one intermediate gear so as to provide a step-up drive ratio in the range of 10:50;

the input gear, the or each intermediate gear, and the rotor of the alternator all having their rotational axes perpendicular to the base of the main casing so that the gears and rotor rotate parallel to the plane of the base;

a rectifier circuit for rectifying the alternator output;

means for mounting a storage device for storing the output of the rectifier circuit;

a control circuit for modifying the rectifier output to a voltage/current appropriate for the consumer device, and wherein the input gear is connected to a drive member rotatable by manual action to rotate the input gear in turn, the axis of the drive member being parallel to the respective axes of the input gear, the or each intermediate gear and the rotor with all the axes lying in a single straight line.

In order that the present invention may be more readily understood, embodiments thereof will now be described by way of example and with reference to the accompanying drawings.

In the accompanying drawings:

FIG. 5 is an exploded perspective view of the alternator of the accessory of FIGS. 1 and 2;

FIG. 10 is an exploded perspective view similar to FIGS. 3 and 8 of a third embodiment of an accessory in accordance with the present invention and for use with a mobile telephone;

Figure 17:
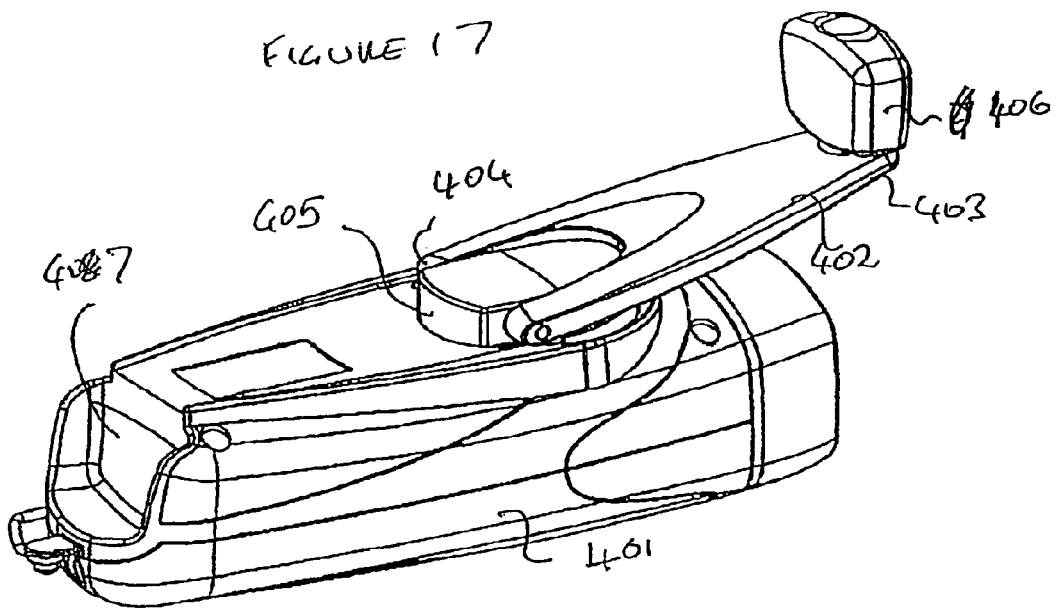
FIGS. 17 and 18 are perspective views of a flashlight in accordance with another embodiment of the present invention.
Figure 18:
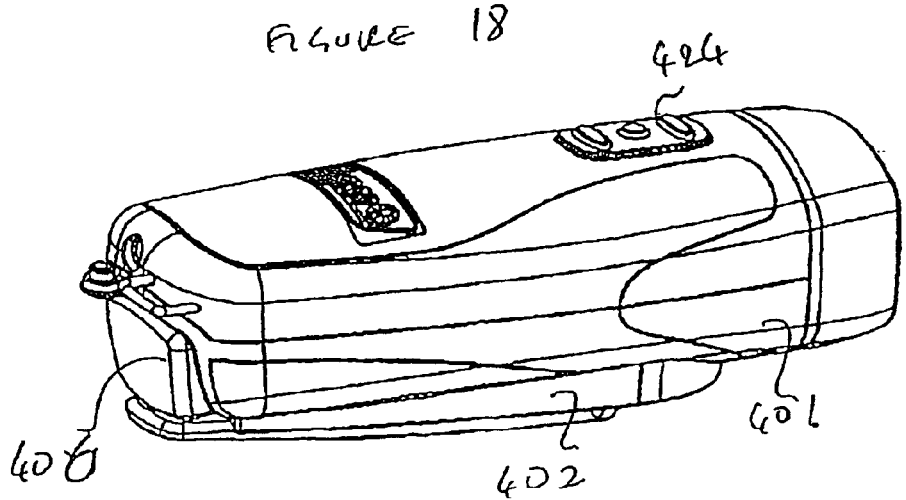
Figure 20:
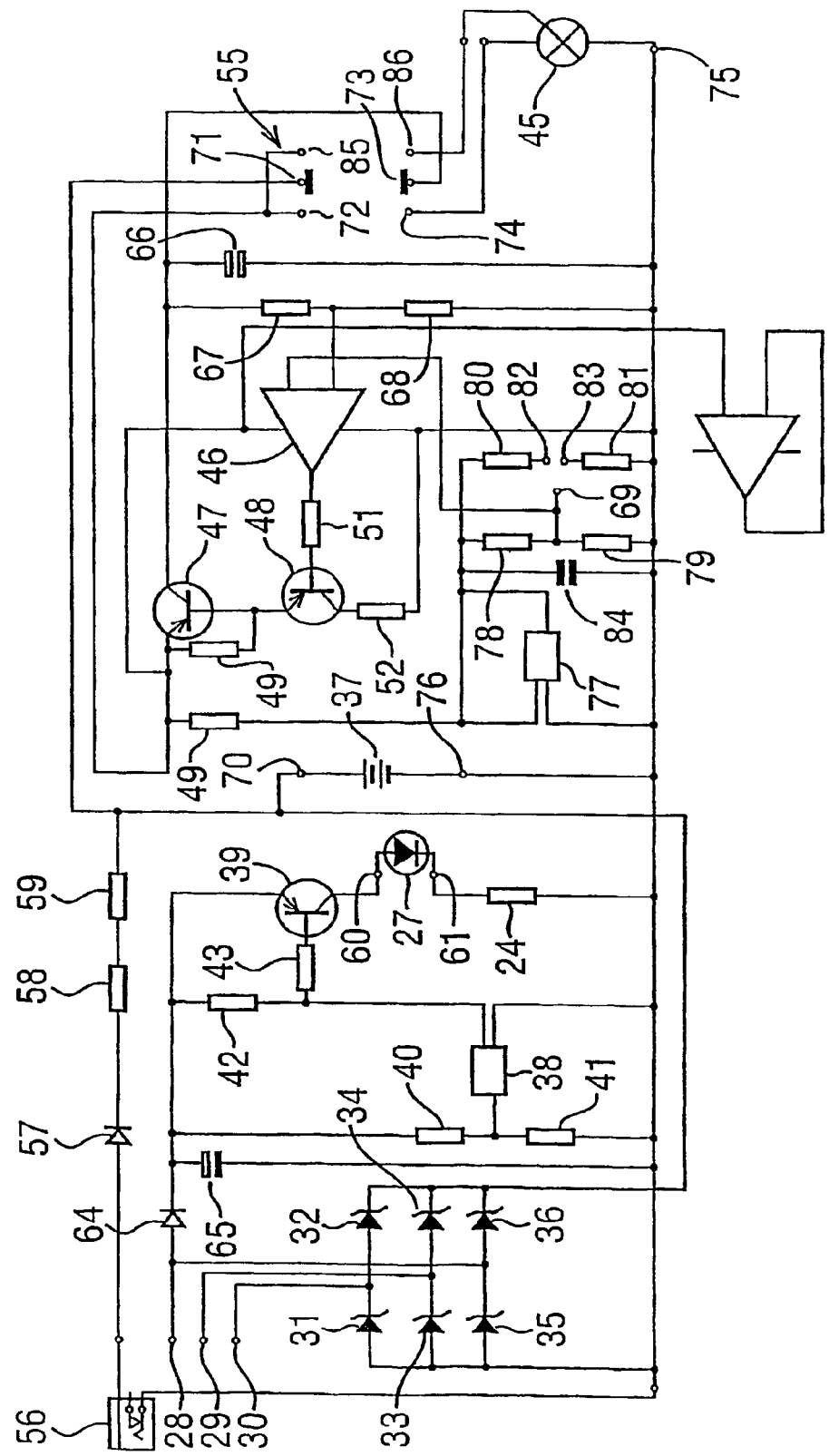

FIGS. 19A, B, C and D are exploded perspective views of the flashlight of FIGS. 17 and 18;

FIG. 20 is a diagram of a power control circuit used in the flashlight; and

Figure 21:
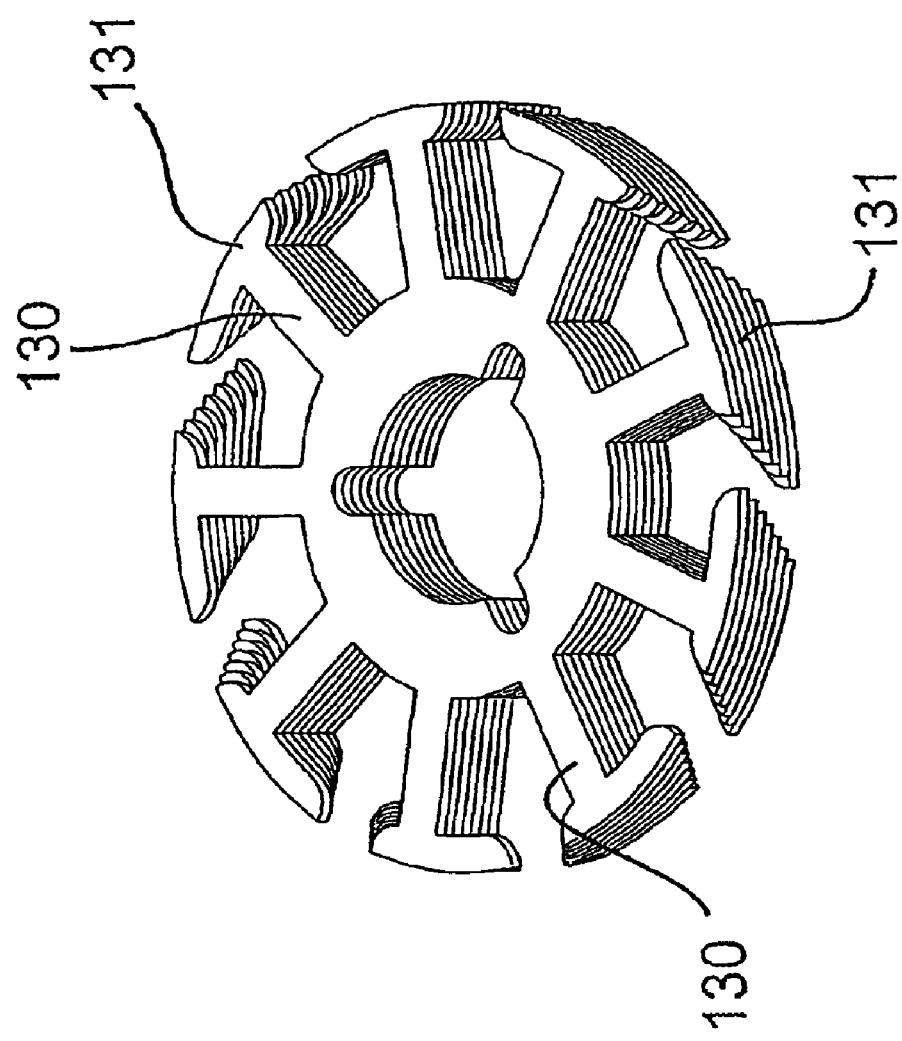
Figure 22:
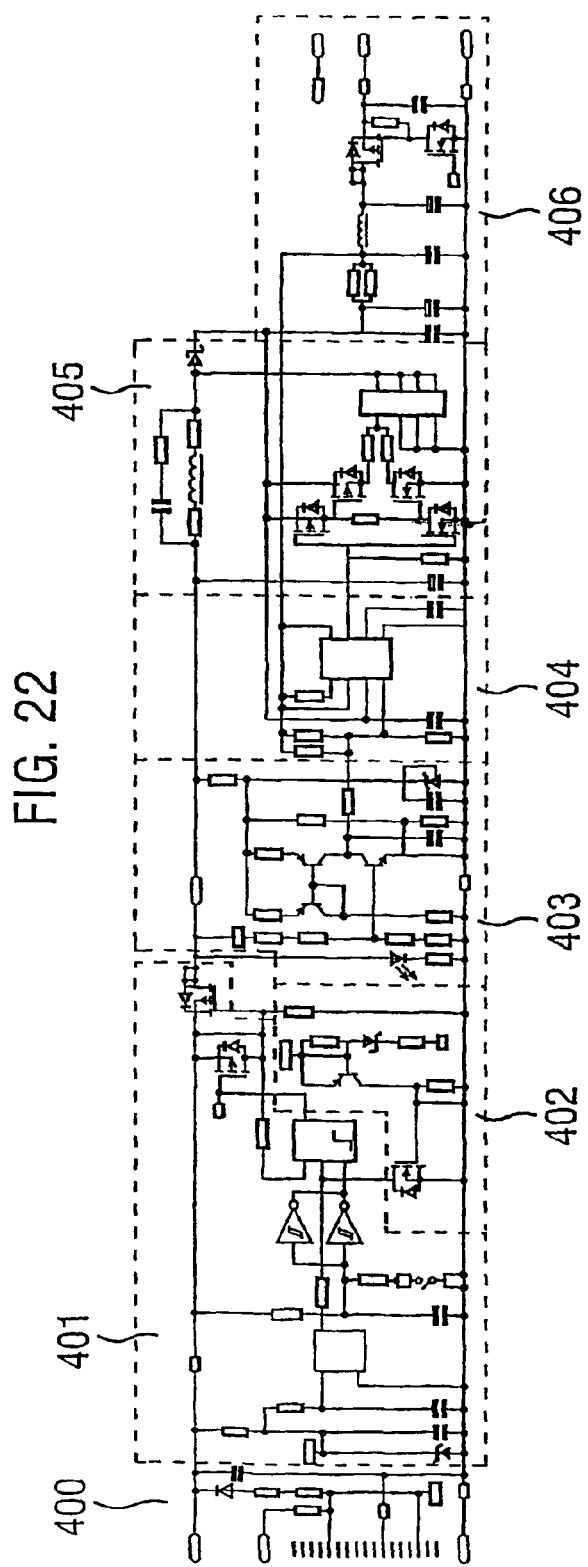
Figure 23:
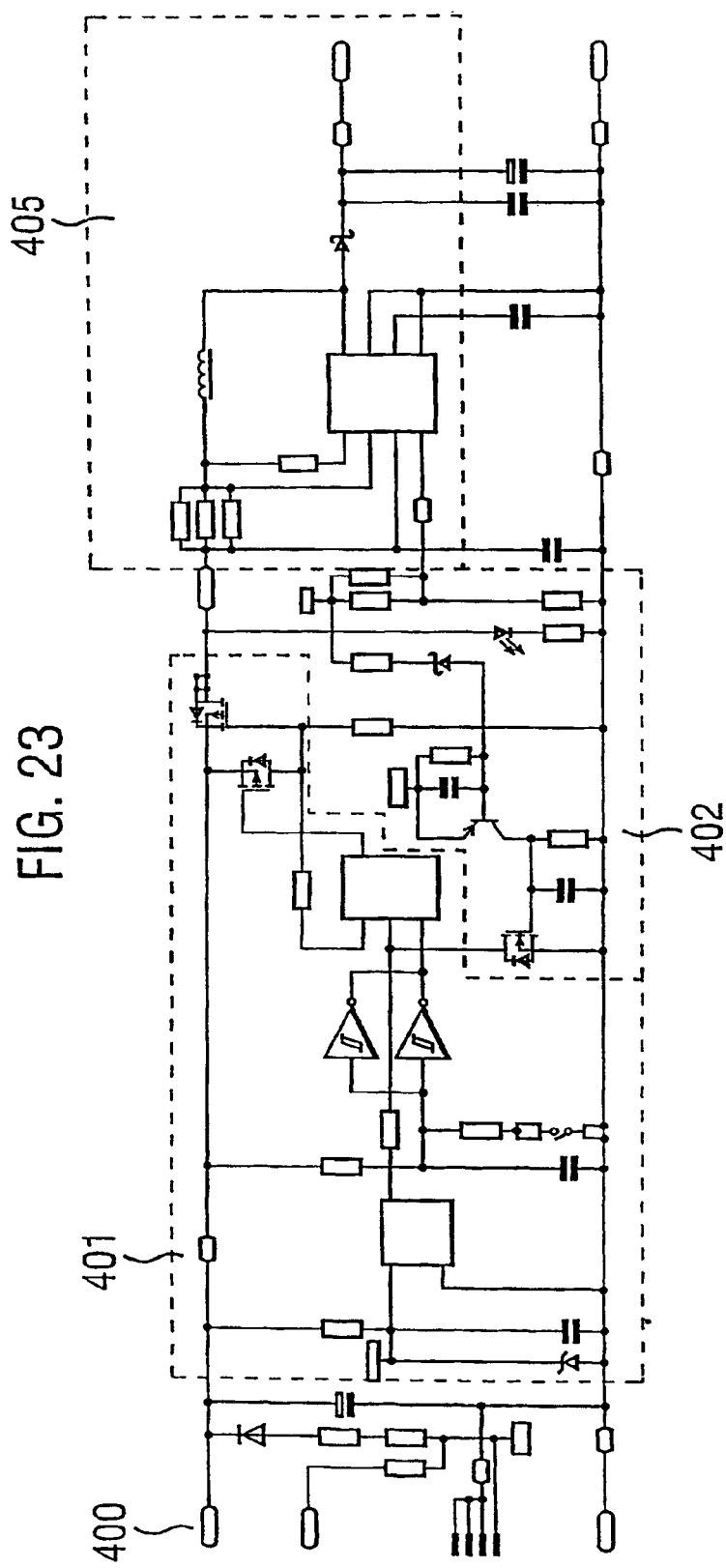
Figure 24:
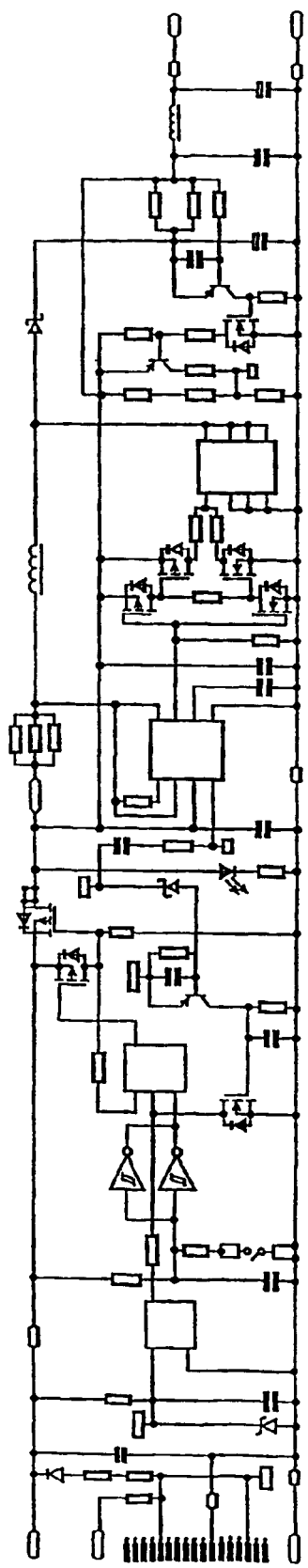

FIG. 21 is a perspective view of a novel stator which can be used in all of the embodiments of the invention.;

FIGS. 22 to 24 are block diagrams of examples of output circuits for specific mobile phones.

Figure 1:
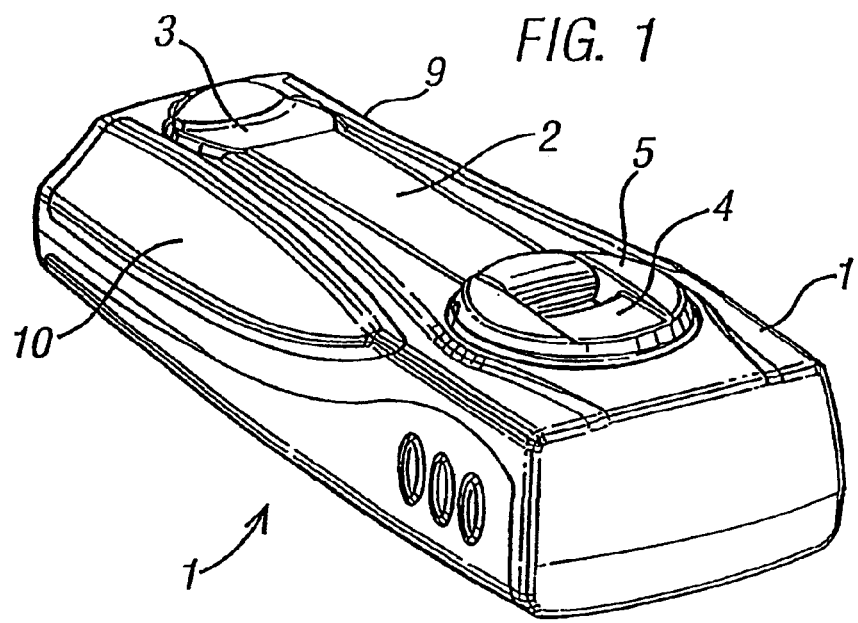
FIGS. 1 and 2 are perspective views of a standalone accessory in accordance with a first embodiment of the invention and for providing electric power to a consumer device.
Figure 2:
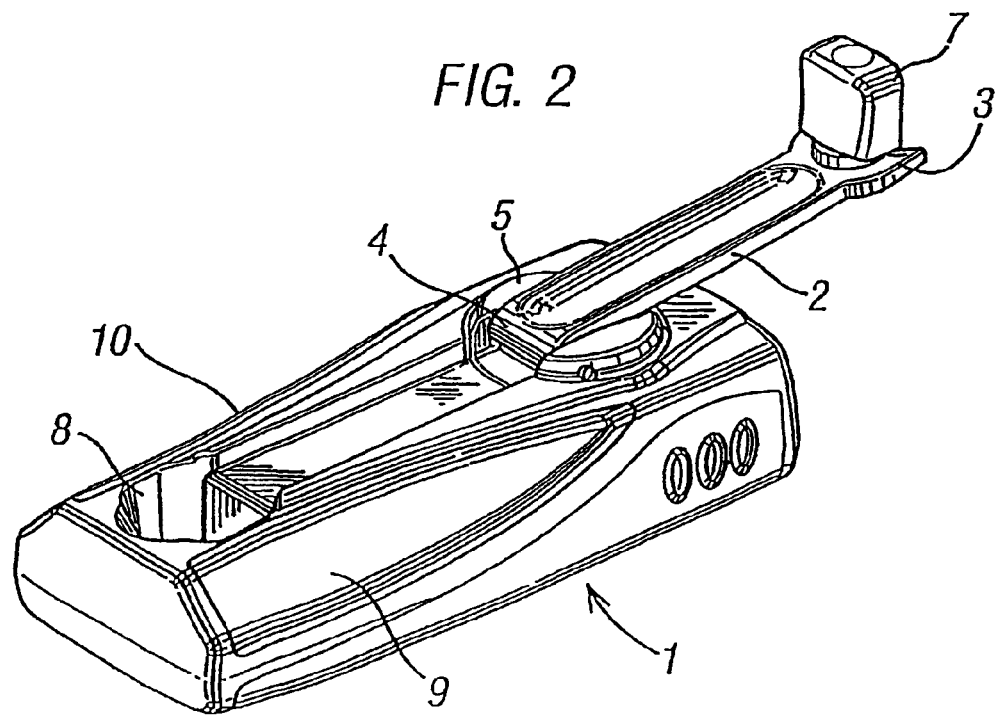

Turning now to FIG. 1 of the accompanying drawings, this shows a standalone accessory having an external casing 1 carrying a folding crank arm 2. The crank arm 2 has a free end indicated at 3 and its other end is pivotally connected at 4 to a crank 5. As can be seen from FIG. 2 the pivot 4 enables the crank arm to be pivoted through substantially 180° and has mounted on its free end a small rubberised handle 7. When the crank arm is stowed in its inoperative position the small rubberised handle sits in a socket 8. The main casing 1 is configured so that it can easily be held in one hand by a user so that the crank mechanism can be operated by the user's other hand. In particular the outer casing is provided with two chamfered portions 9 and 10 suitably dimensioned so that they can be easily gripped by the fingers of a user.

For ease of assembly the casing 1 is manufactured in two parts namely a top casing 11 and a bottom casing 12. The two casing halves are connected by bolts (not shown) passing through cylindrical protrusions 13 and 14 which also act to locate the top casing with respect to the lower casing when they are assembled together.

The length of the crank arm is designed to optimise power input for a particular input speed and the crank 5 itself is mounted on a low friction bearing.

Figure 3:
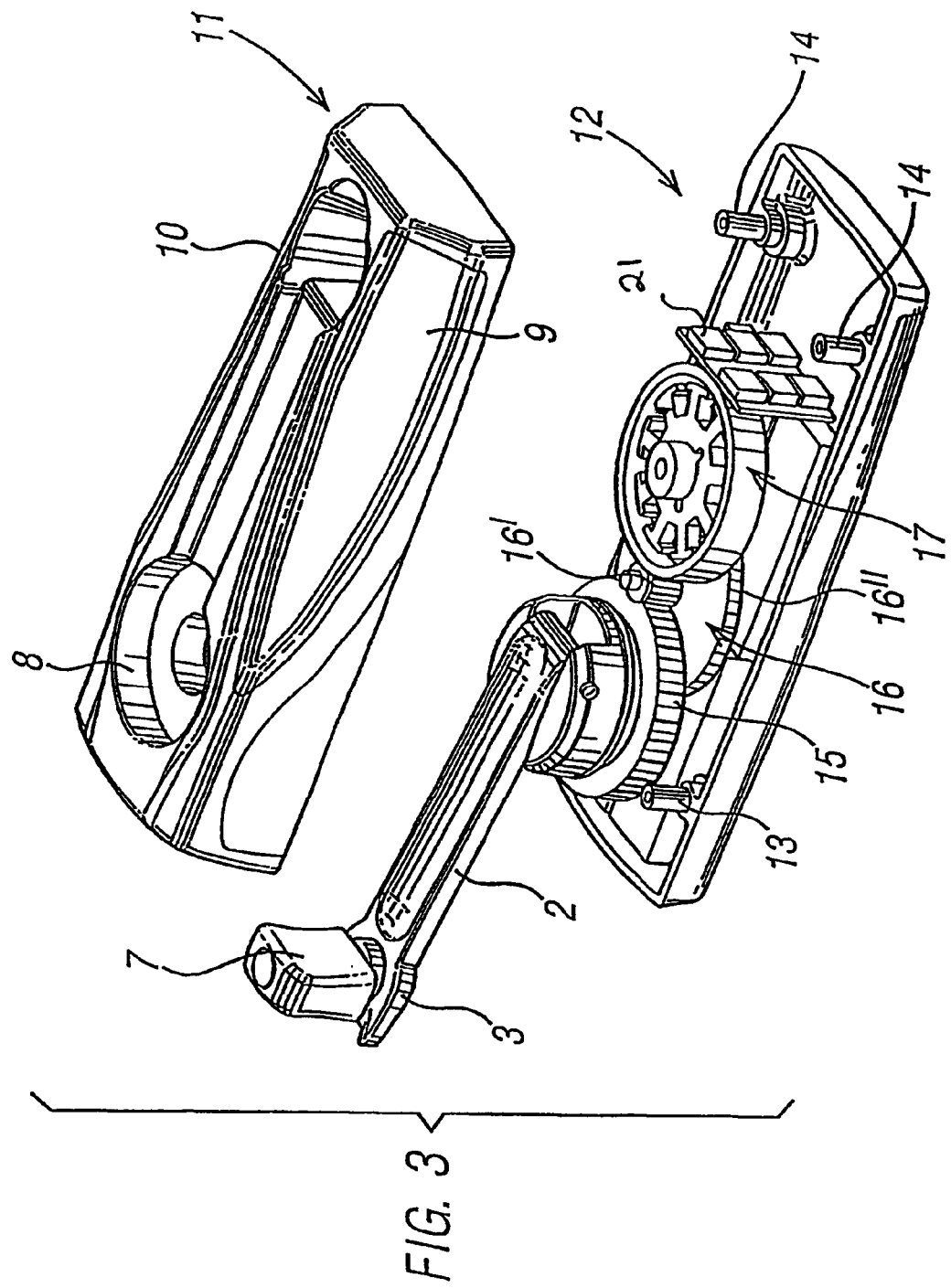
FIG. 3 is an exploded perspective view of the accessory of FIGS. 1 and 2.
Figure 4:
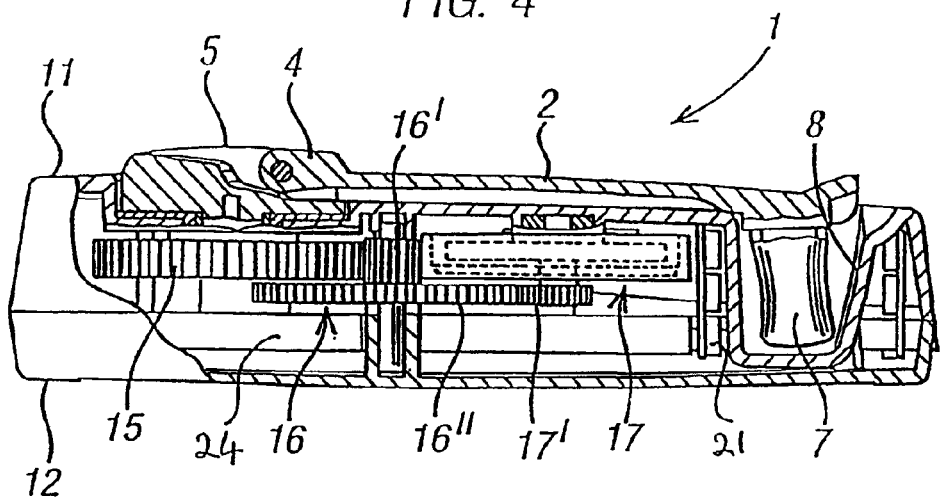
FIG. 4 is a longitudinal section through the accessory of FIGS. 1 and 2.

As can be seen from FIGS. 3 and 4 the crank arm 2 is connected directly to an input gear 15 which transfers the relatively low speed rotation from the crank mechanism to an intermediate gear 16. The input gear 15 has straight cut teeth for high efficiency and as it transfers high torque it also has wide tooth faces.

The intermediate gear 16 receives motion from the input gear via a small diameter gear wheel 16' and transfers motion from the input gear 15 to an alternator assembly generally indicated at 17 via a large diameter gear 16" which meshes with a small diameter gear 17' of the alternator assembly. Thus the intermediate gear transfers motion from the input gear to the alternator assembly and at the same time increases the relatively low speed input from the input gear 15 to a high speed output suitable for the alternator. A suitable gearing ratio for this transference is for one rotation of the input gear 15 causes between 10 and 50 rotations of the alternator assembly 17. The choice of the gear ratio is a matter of some importance. The ideal is to have a relative low manual input rpm with high efficiency output from the alternator. A typical input (crank) rpm which can be easily achieved by a user is between 100 and 140 rpm. If high power is requested from a small package then a higher gear ratio would be needed. However this can cause problems because of a high initial torque requirement. In the present embodiment the ratio is 24.

The alternator is shown in exploded form in FIG. 5 and an alternator stator 18 carrying on its radial arms copper windings which are not shown and an alternator rotor 20 in which are mounted magnet segments 19 which provide the rotor poles. The alternator uses a three phase stator winding with nine stator teeth and twelve rotor poles making in total six pole pairs. It is of course possible that more than three phases may be used. The alternator rotor 20 is in the form of a flattened cup with a boss. The gear 17' is mounted on this boss.

The magnets used in the alternator 17 are a high grade of neodium-iron-boron (NFeB, or NiB) sintered rare earth magnets. The alternator has a relatively high initial cogging torque, which is multiplied backwards by the transmission ratio, so that an unacceptably high starting torque can result. In order to reduce the effect of this cogging torque the faces of the stator teeth are skewed about the alternator axis the stator pack in this embodiment are skewed about the alternator axis. It is possible for the laminations to be identical with each lamination angularly skewed with respect to its neighbouring laminations in order to achieve the necessary skewed effect. It is, however, preferred for the laminations to differ. This is described in greater detail with respect to FIG. 21. The skewing of the laminations has the secondary effect of smoothing the torque input and giving quiet operation even during high power generation. The alternator rotor 20 is mounted in a sintered brass bush impregnated with very low friction lubricant.

The stator pack 18 is made up of a number of laminations of thin steel so as to reduce eddy currents and their associated losses. Because of this high field strength it is essential to ensure the accurate location of the alternator rotor. Thus the alternator rotor 20 is located axially only by the magnetic field associated with the magnetic circuit formed by the alternator stator, alternator rotor and the magnet segments. Thus it is not fixed with regard to movement along the axis of its rotation. This ensures that there is no axial bearing loss and locates the alternator rotor automatically in the optimum position for maximum flux density in the stator teeth. The stator axial locating face is machined with the rotor bearing housing in the same operation in order to ensure that the stator and the rotor are properly aligned to avoid out of plane magnetic forces which would increase friction bearing and reduce flux density.

The output of the alternator 17 is taken to a rectification module 21 which houses a three phase rectifier which converts the three phase alternating current power output from the alternator to direct current. If the device is intended to output a high voltage surface mounted Schottky barrier diodes are used for passive rectification. For low voltage devices an active rectification system is used to minimise rectification losses and maximise efficiency. Both these rectification circuits are completely conventional.

Figure 6:
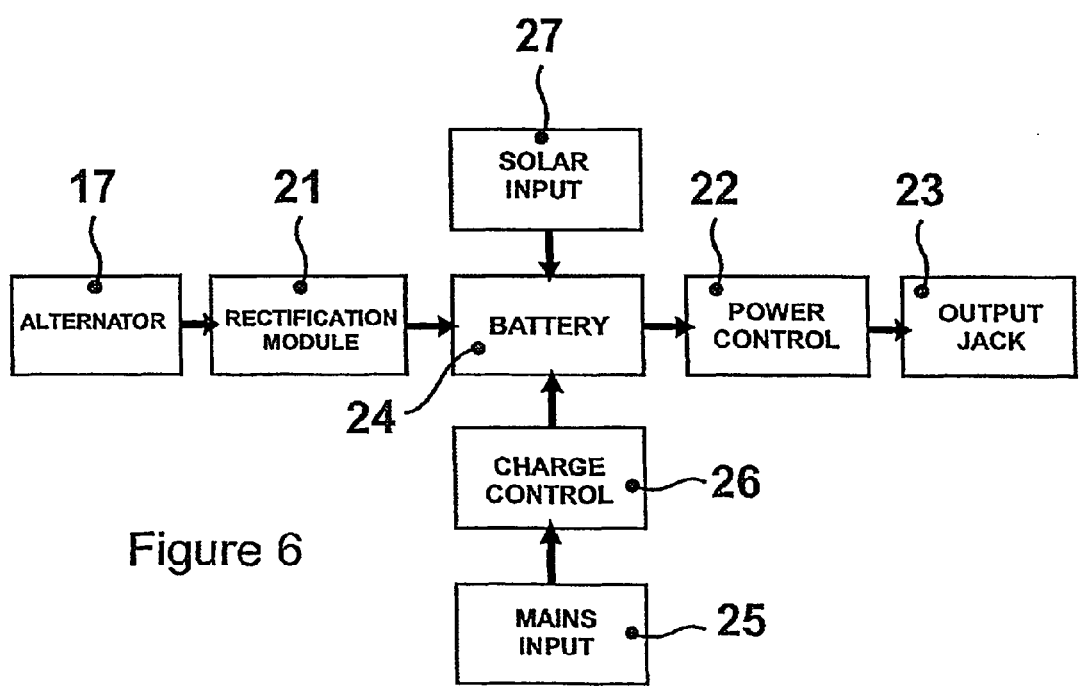
FIG. 6 is a block diagram of a control circuit.

FIG. 6 of the accompanying drawings is a block diagram indicating the layout of the alternator and subsequent circuitry. Thus the output of the rectification module 21 is supplied to a storage device, this storage device accepts energy in an electric format that is optimized for the highest power density and efficiency from the alternator and is specified in such a way as to accept high energy power density and efficiency from the alternator and is specified in such a way as to accept high energy content in a short period of time. Typical examples of such energy storage devices are secondary cells such as Nickel Cadmium rechargeable, Nickel Metal Hydride rechargeable, Lithium Ion rechargeable and Lithium Polymer rechargeable batteries as well as capacitors of large capacity. The storage device subsequently delivers the electricity to an output jack 23 that plugs into the consumer device via. power control circuitry 22. The output from the control block 22 is, amongst other factors, essential to perform conversion from the dc constant voltage from the storage device to the power format required by the consumer device. Thus the output from the power control block 22 may take a range of formats which may include pulsed voltage, current limited constant voltage, sinusoidal voltage and current/constant voltage as required.

It will be appreciated when the generator is used for mobile phones, for example, that each mobile phone company produces mobile phones which have different protocols with regard to the way in which the phones will accept power at the start of and during their operation. The output of the power control block is supplied to an output jack 23 by means of which the device can be connected to a consumer device either directly or via an appropriate cable.

Where the battery module contains a plurality of batteries, the power control module can be arranged so that when the batteries are being charged they are charged in series so as to allow a high input voltage and thus more efficient operation of the alternator. Alternatively, when the output of the battery is being used to drive a consumer device the batteries are discharged in parallel at cell voltage which is likely to be a voltage both more suited to the power control module and the consumer device.

Also shown in FIG. 6 is a mains ac input 25 by means of which the battery or batteries can be charged via a charge control module 26. In some cases the ac input may be a dc input. Finally, FIG. 6 shows in diagrammatic form a solar panel 27 which can also be used to provide a steady charge to the battery or batteries in the battery module. As can be seen this power input does not act via the power control module 22.

Figure 7:
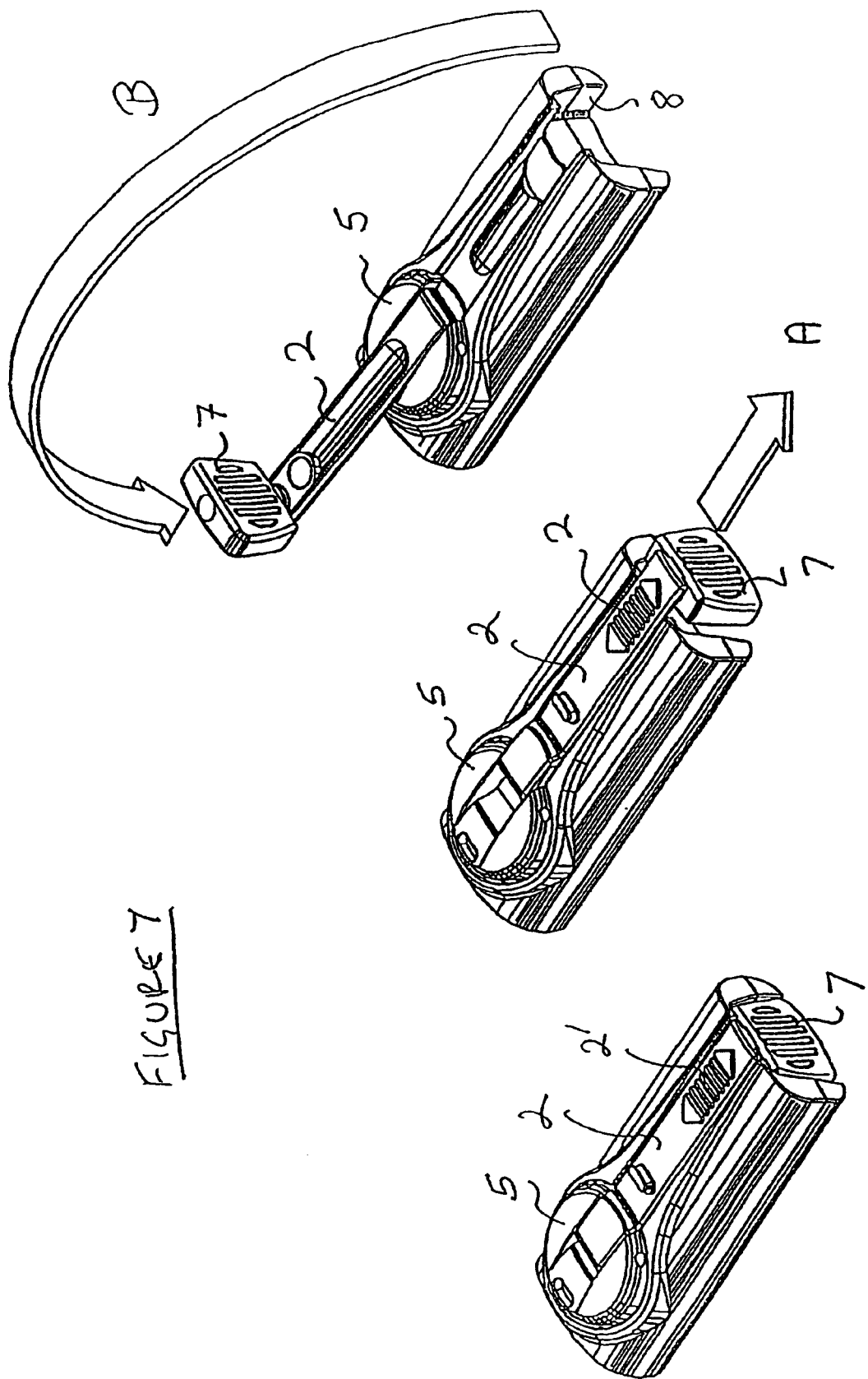
FIG. 7 shows three perspective views of a second embodiment of a stand alone accessory.
Figure 8:
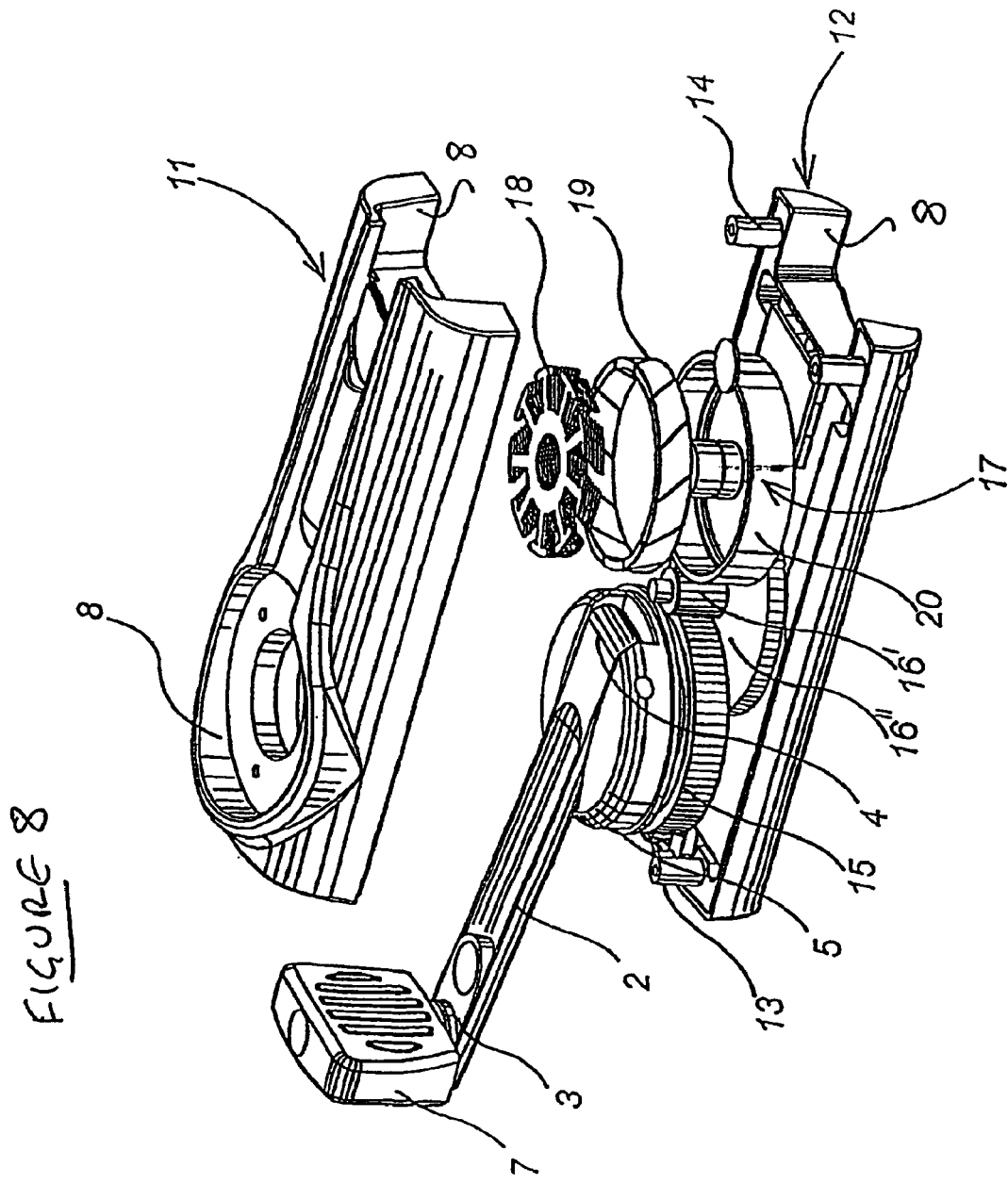
FIG. 8 is an exploded perspective view of the embodiment of FIG. 7.
Figure 9:
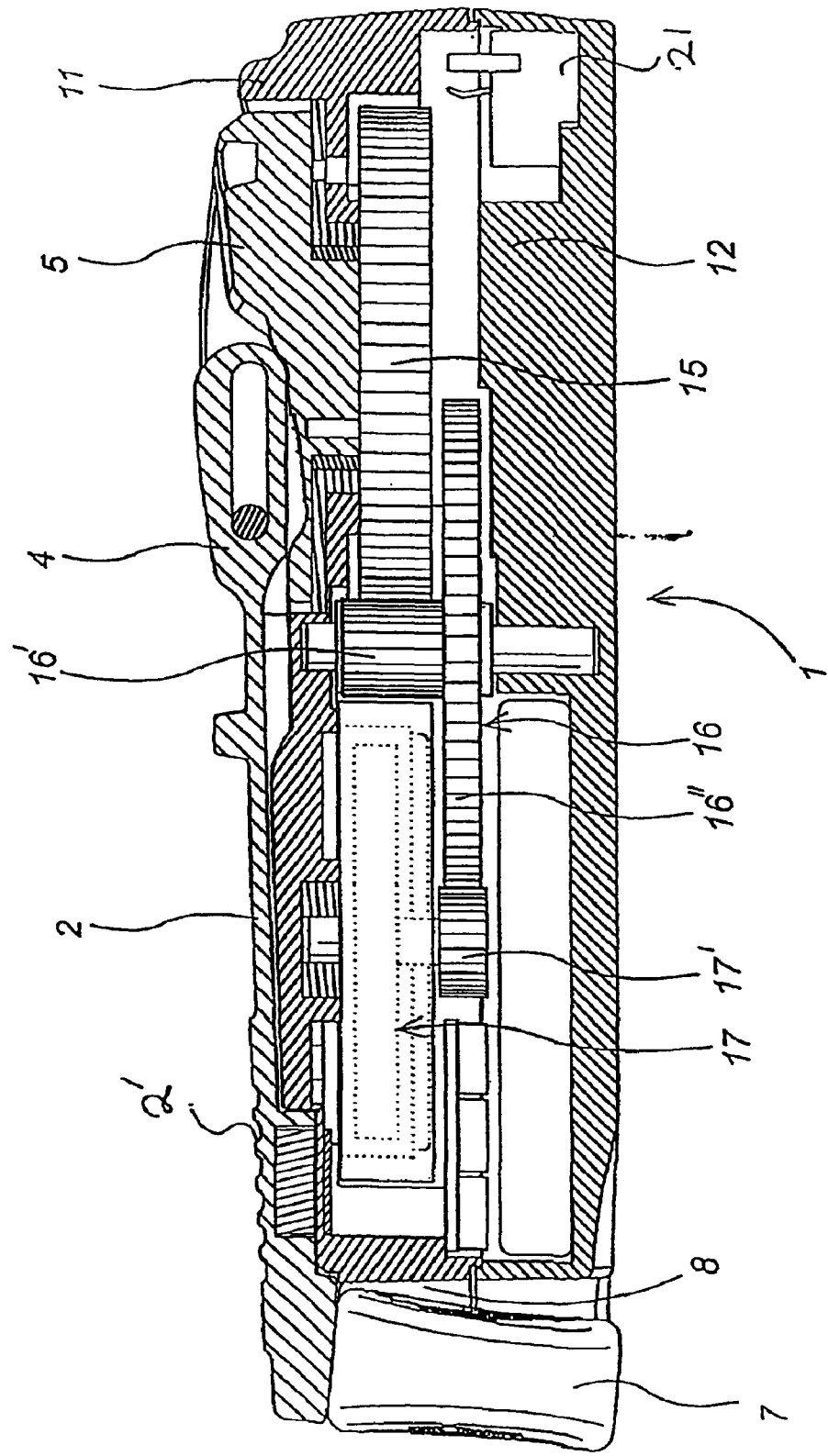
FIG. 9 is a section through the embodiment of FIG. 7.

Turning now to FIGS. 7, 8 and 9 of the accompanying drawings it will be seen that these show a hand-held generator very similar in many aspects to the first embodiment.

This second embodiment is particularly concerned with dealing with the conflicting requirements of providing a portable, hand-held generator which is both compact and yet efficient. As the generator largely uses a manual input it will be appreciated that there is a link between efficiency and ease of use and the length of the crank arm by means of which a user imparts drive to the generator.

In the first embodiment the length of the crank arm is limited by the length of the casing as the handle on the end of the arm has to be stored in a recess in the casing. Thus it is difficult to provide both a crank arm of a length which is ergonomically efficient and a device having a short overall length. This is the problem addressed in the second embodiment.

In FIGS. 7, 8 and 9 integers which are common to the first embodiment have been given the same reference numerals.

Referring now to FIG. 7 the first of the views shows the crank arm 2 in its stored position. The rubberised handle 7 is larger than the handle 7 of the first embodiment and accordingly is also more ergonomically efficient. This increase in size of handle 7 is achieved by providing the end of the main casing 1 with an open-ended recess 8 into which the handle 7 is a clip fit. It will also be seen that the upper surface of crank arm 2 is provided at 2' with a series of ridges. These are intended to provide purchase for a user's fingers. Finally the crank arm 2 is linked to its pivotal connection to the crank 5 via a sliding coupling. This coupling will be described in greater detail hereinafter but by means of the sliding coupling and the ridges 2' the handle 7 can be unclipped from the recess 8 and moved in the direction of arrow A. The crank arm is then pivoted as shown by arrow B into its operative position in which the ratio of its operative length to the length of casing 1 is greater than the corresponding ratio of the first embodiment.

Referring to FIGS. 8 and 9 of the accompanying drawings it will be seen that the arrangement of input gear 15, drive gears 16 and alternator 17 are identical to he first embodiment. Additionally the control circuitry of this embodiment is the same as that of the first embodiment as is the battery. Thus these integers together with the battery will not be described further. However in the second embodiment the pivotal coupling is provided by a cross rod 4' mounted on the crank 5 and located in a longitudinal slot in the end of the crank arm 2. In the stored position of the crank arm as shown in FIG. 9 the pivot arm abuts the left hand edge of the slot whilst once the crank arm is moved in the direction of arrow A in FIG. 7 it will abut the right hand edge of the slot thus providing a useful extension of the crank arm's length.

Figure 11:
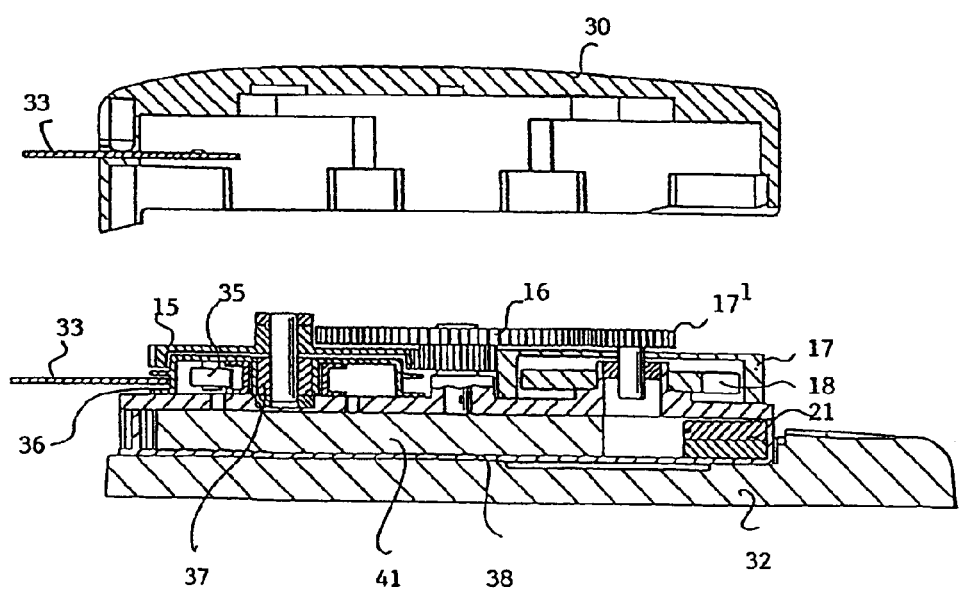
FIG. 11 is a section through the embodiment of FIG. 10.

Turning now to FIGS. 10 and 11 of the accompanying drawings it will be seen that these Figures discloses a third embodiment of the present invention.

In particular the embodiment of FIGS. 10 and 11 is a clip-on accessory which can be clipped on to a device such as a cellphone so as either to replace the device's normal battery power supply or in fact as to act as the main supply of the consumer device to which it is attached.

Referring now to FIG. 10 of the accompanying drawings this shows the third embodiment with its top casing 30 separated from the main body 31 of the device with the operative portion of the device clipped into place on a cellular phone generally indicated at 32.

As with the previous embodiment the device includes an input gear 15 meshing with an intermediate gear 16 in turn driving an alternator assembly 17 via a gear 17'. The construction of the alternator assembly 17 and the associated drive gearing is very similar to that disclosed in the first embodiment so that similar reference numerals are used. Additionally the design of the alternator rotor, magnets and stator winding are the same as that of the previous embodiments except that the stator rotor is inverted. However, in this embodiment the method by which a user rotates the input gear 15 is different in that it comprises a pull-cord 33 wound around a bobbin 34 provided with a pair of constant torque springs 35 which act to return the cord into the wound condition after it has been pulled by a user. Only one spring 35 is shown. The two springs are mounted on respective spring posts and a spring-locking collar. Thus the bobbin acts to translate the linear motion of the cord into rotational motion and to house the pull-cord 33. The cord 33 when wound up is housed between spaced circular flanges 36. The bobbin is mounted on a one-way clutch bearing 37 which transmits its motion when rotated by the pull cord to the input gear 15. Preferably the cord is furnished at its free end with a loop which fits around a user's wrist. The input gear 15 meshes with an intermediate gear 16 which in turn drives an alternator gear 17' as in the previous embodiments. In this embodiment the gear ratio between the drive bobbin and the alternator rotor is preferably between 9 and 17. The detailed construction of the rotor and stator of the alternator 17 is identical to that of the alternator of the first embodiment and so will not be described again.

The clip-on accessory is provided with a base plate 38 dimensioned to fit the mounting area on the rear face 39 of the cellphone 32 which would normally receive the cellphone's battery pack. Immediately above this base plate the clip-on accessory houses a battery or batteries 41 which can be of exactly the same type as the batteries described in the first embodiment.

Additionally as with the previous embodiment the clip-on device is provided with a power management module 21 which is similar to that disclosed in the first embodiment but as the clip-on device is designed for a specific phone unit once again the operation of the power management module will be dependent on the nature of power required by the cellphone so that in many instances a simpler power management unit can be employed. In particular the Clip-on unit does not need to follow the charging protocols of the previous embodiments as there is direct access to the phone's own battery.

Figure 12:
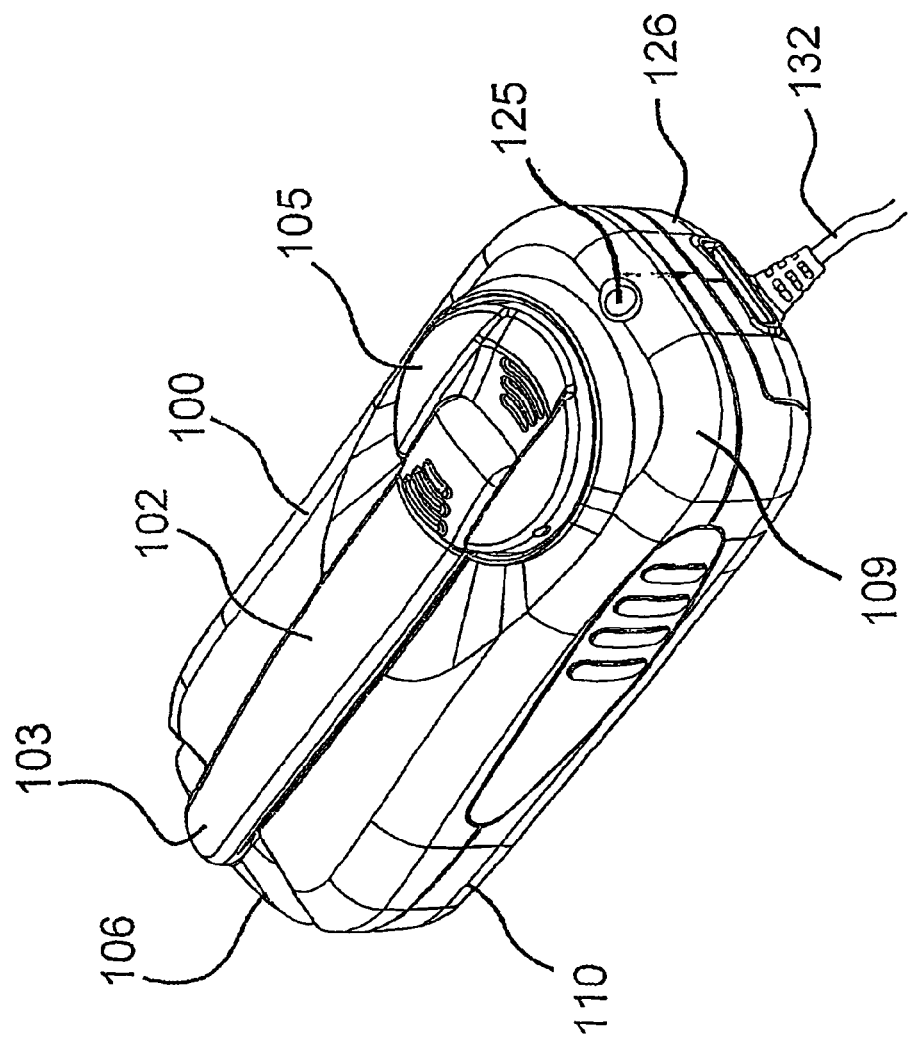
FIG. 12 is a perspective view of a standalone cell phone charger and detachable unit in accordance with another embodiment of the present invention.

Turning now to FIG. 12 of the accompanying drawings this shows a perspective view of a hand-held generator particularly designed for cell phone.

Thus FIG. 12 shows a cell phone charger having an external casing 100 carrying a folding crank arm 102. The crank arm 102 has a free end indicated at 103 and its other end is pivotally connected at 104 to a crank 105. The pivot 104 enables the crank arm to be pivoted through substantially 180° and the arm has mounted on its free end a handle 106 which can pivot about a pivot post 107. When the crank arm is stowed in its inoperative position the handle sits in a socket 108. As in the previous embodiments the main casing 100 is configured so that it can easily be held in one hand by a user so that the crank mechanism can be operated by the user's other hand.

For ease of assembly the main casing 100 is manufactured in two parts 109 and 110.

The length of the crank arm is designed to optimise power input for a particular input speed and the crank 105 itself is mounted on a low friction bearing.

The generator mechanism to which the crank 105 is attached is identical to that already described and so will not be described again.

Figure 13:
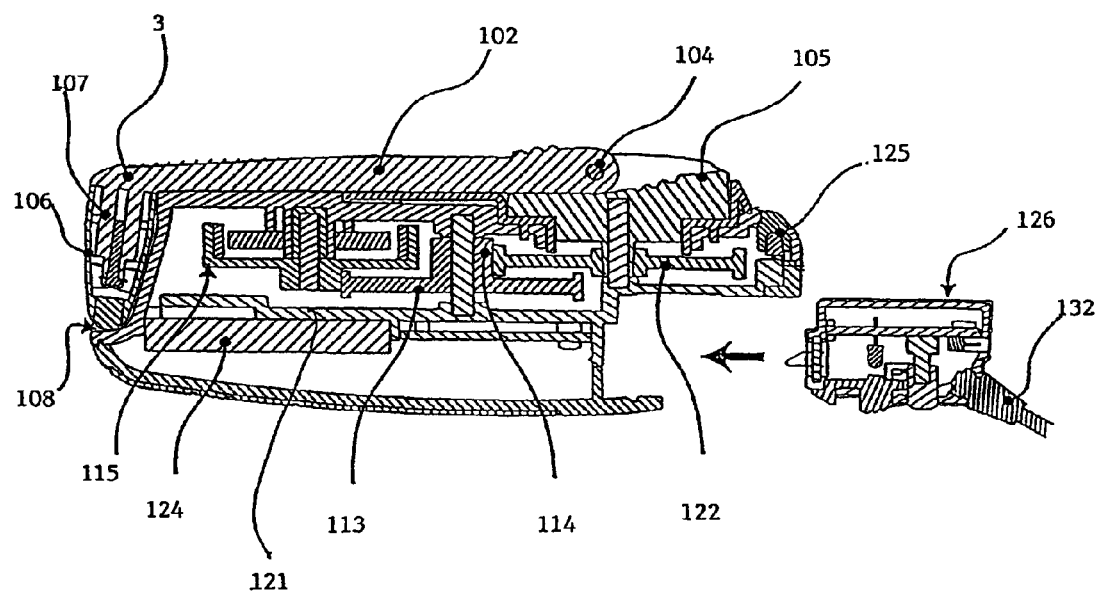
FIG. 13 is a longitudinal section through the charger of FIGS. 1.
Figure 14:
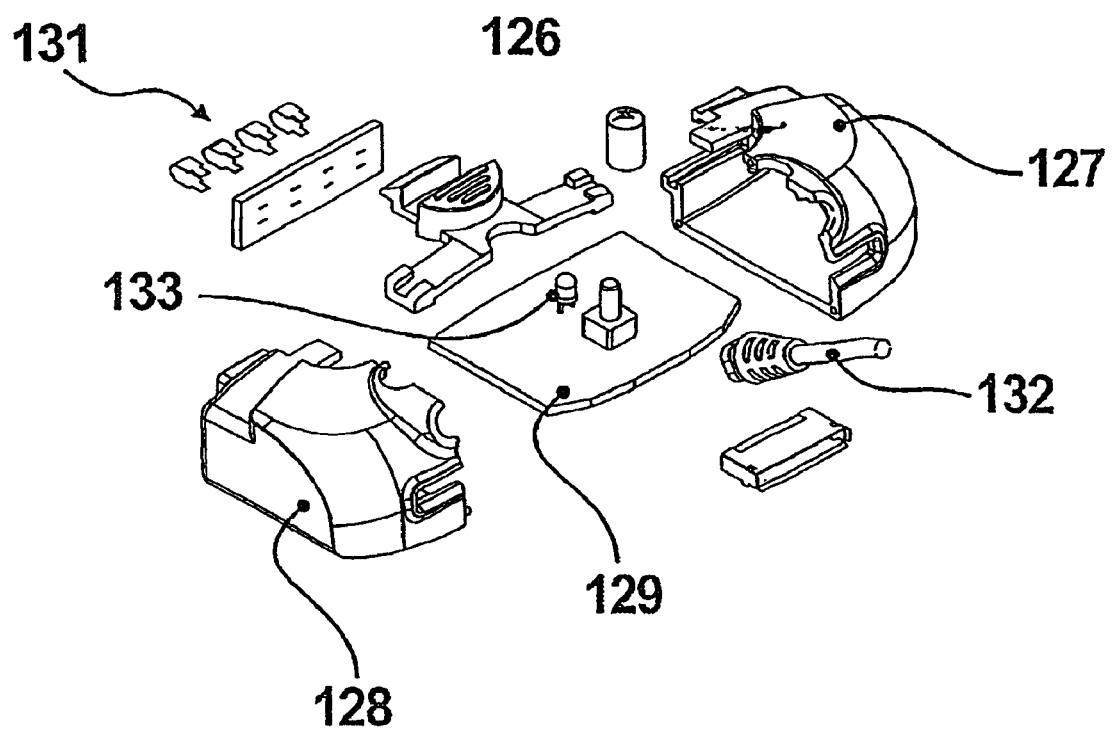
FIG. 14 is an exploded perspective view of part of the charger of FIG. 12.

As can be seen from FIG. 12 the two casing parts 109 and 110 when bolted together sandwich a central substantially planar body 121 which carries a circuit board 122 for regulating the output of the alternator and having four connection pads. These pads are shown in FIG. 15 which shows circuit board 122 in greater detail. The main unit also houses a Lithium-ion battery 124. This battery can be charged either by the alternator or by the charger unit normally supplied with every cell phone, the power from the charger unit being supplied, as will be described hereinafter, via the detachable pod. As can be seen from FIGS. 13 the main generator unit has an LED 125 for indicating usable output from the alternator. The other main component of the device as shown in FIGS. 12 and 13 is a detachable pod generally indicated at 126. This pod is also made from two molded halves which are shown in FIG. 14 at 127 and 128 and which are secured together so as to locate a central plate 129 carrying a circuit board 130 which has four copper connection points 131 for connection to the corresponding output pads 123 of the circuit board 122 of the main generator unit. The pod 126 also carries an output cable 132 the free end of which carries a connector appropriate to the particular cell phone with which the entire assembly is to be used. The circuitry in circuit board 129 will be described in greater detail hereinafter but amongst other functions ensures that the output of the main unit takes a format appropriate to the particular cell phone with which this generator is to be used. As already stated it must be appreciated that virtually every cell phone manufacturer has different standards by means of which their particular cell phones will only accept a particular format of charging current and voltage. These standards are proprietorial to the individual manufacturers and are set by appropriate, but entirely conventional circuits. The main casing carries an LED 125 which be used. Additional pod 126 carries an LED 133 which is used as an indication to a user when the battery in the main unit is being charged by a standard mains powered charger via the pod.

Turning now to FIG. 15 of the accompanying drawings this shows the circuit of the circuit board 122. In this circuit the output of the alternator is connected to contact pads 140, 141 and 142 and is rectified by diodes 143, 144, 145, 146, 147 and 148 so as to charge the battery 124 which in operation is mounted between contact pads 149 and 150.

In operation current flows through diodes 146, 147 and 148 to pad 149 and via the battery 124 to pad 150 and back to diodes 143, 144 and 145.

Figure 15A:
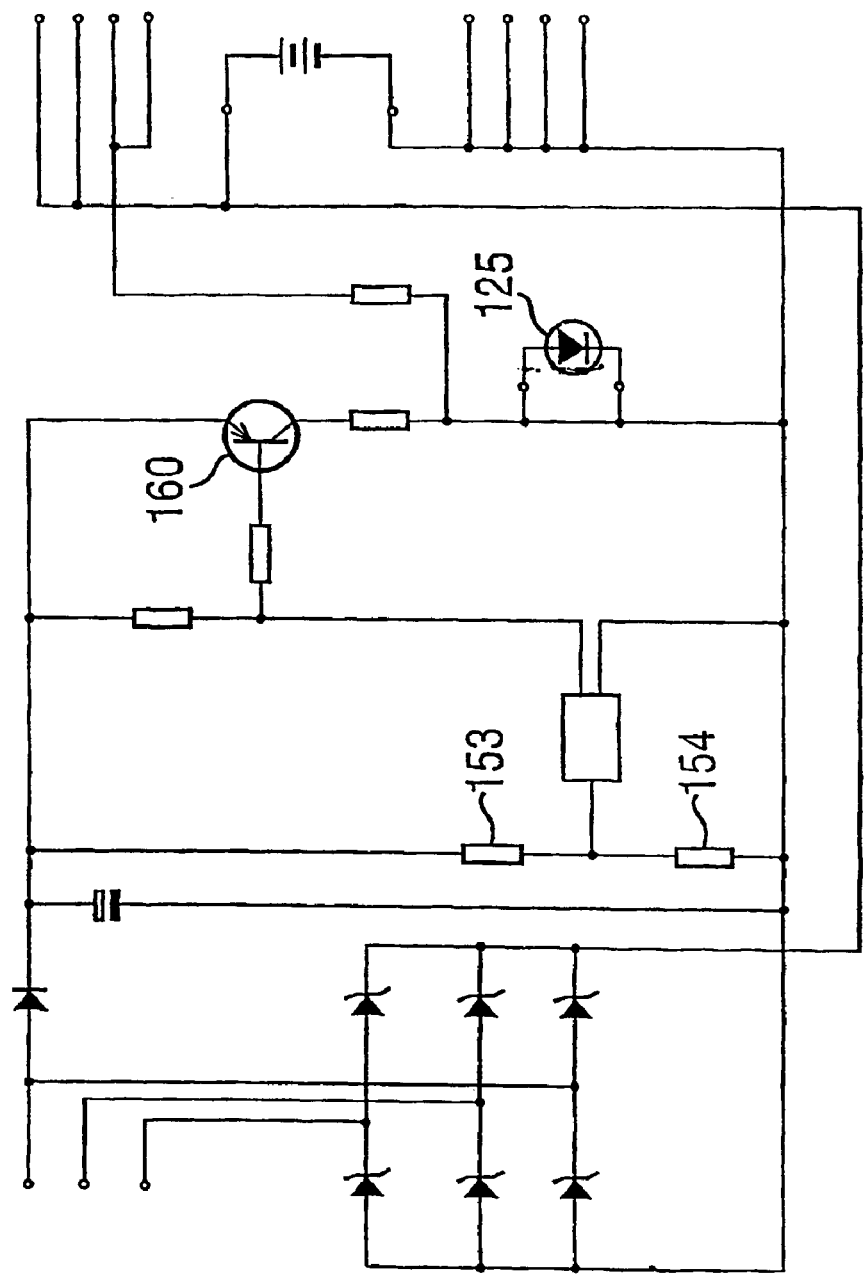
FIGS. 15A and 15B are a block diagram of a rectification and effort indication power control circuit either of which can be housed in the main body of the phone charger.

The circuit of FIG. 15A also includes an effort indicator circuit to show that meaningful output is being created by the alternator. In the effort indicator circuit alternator output is taken from pad 140 via halfwave rectifier diode 151 and is smoothed by capacitor 152. A high precision reference circuit 155 will try to divert this current via diode 151, capacitor 152, its "K" terminal and terminal "A" to ground when the voltage across capacitor 152 exceeds a pre-set voltage. This pre-set voltage is set by the ratio of resistors 153 and 154, the junction of which is connected to the reference input of reference circuit 155. Current will also be diverted via the emitter and base of transistor 156 and resistor 158 to reference circuit 155. Thus transistor 156 will switch on. Current will then flow from the emitter and collector of transistor 156, resistor 160, pad 162, LED 125, pad 163, to ground and the LED 125 will illuminate to show optimum input. The circuit of FIG. 15 can be coupled to the circuit shown in FIG. 16 via pads 76, 77, 78 and 79. Pads 80 are in operation connected to earth.

Figure 15B:
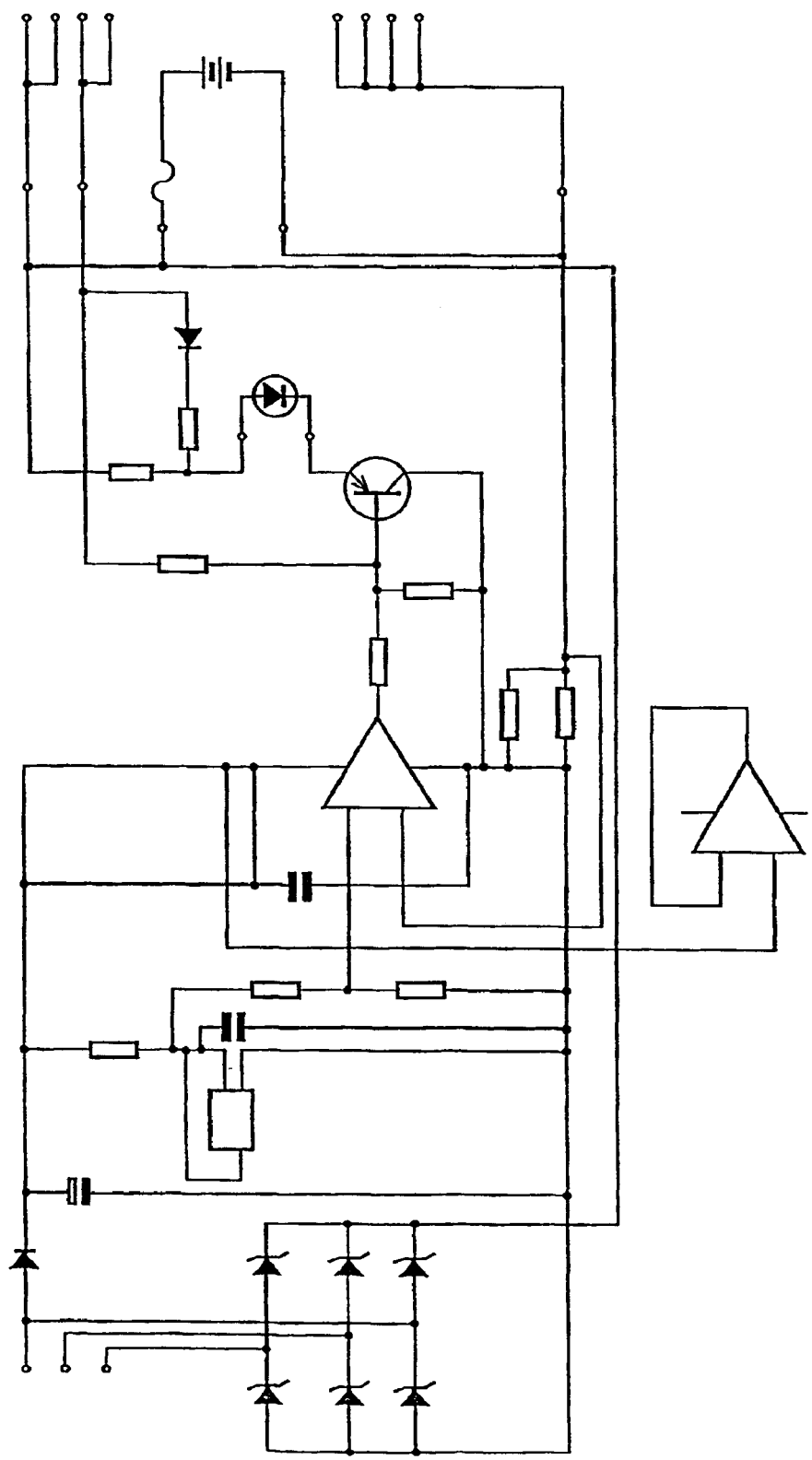

Sensing effort using the voltage generated presents a problem in that there can be substantial voltage changes over a relatively small range of input RPM. It will be appreciated that it is also possible to measure input effort by monitoring the generated current and this is what is done in FIG. 15B. The components of FIG. 15B are all conventional.

Figure 16:
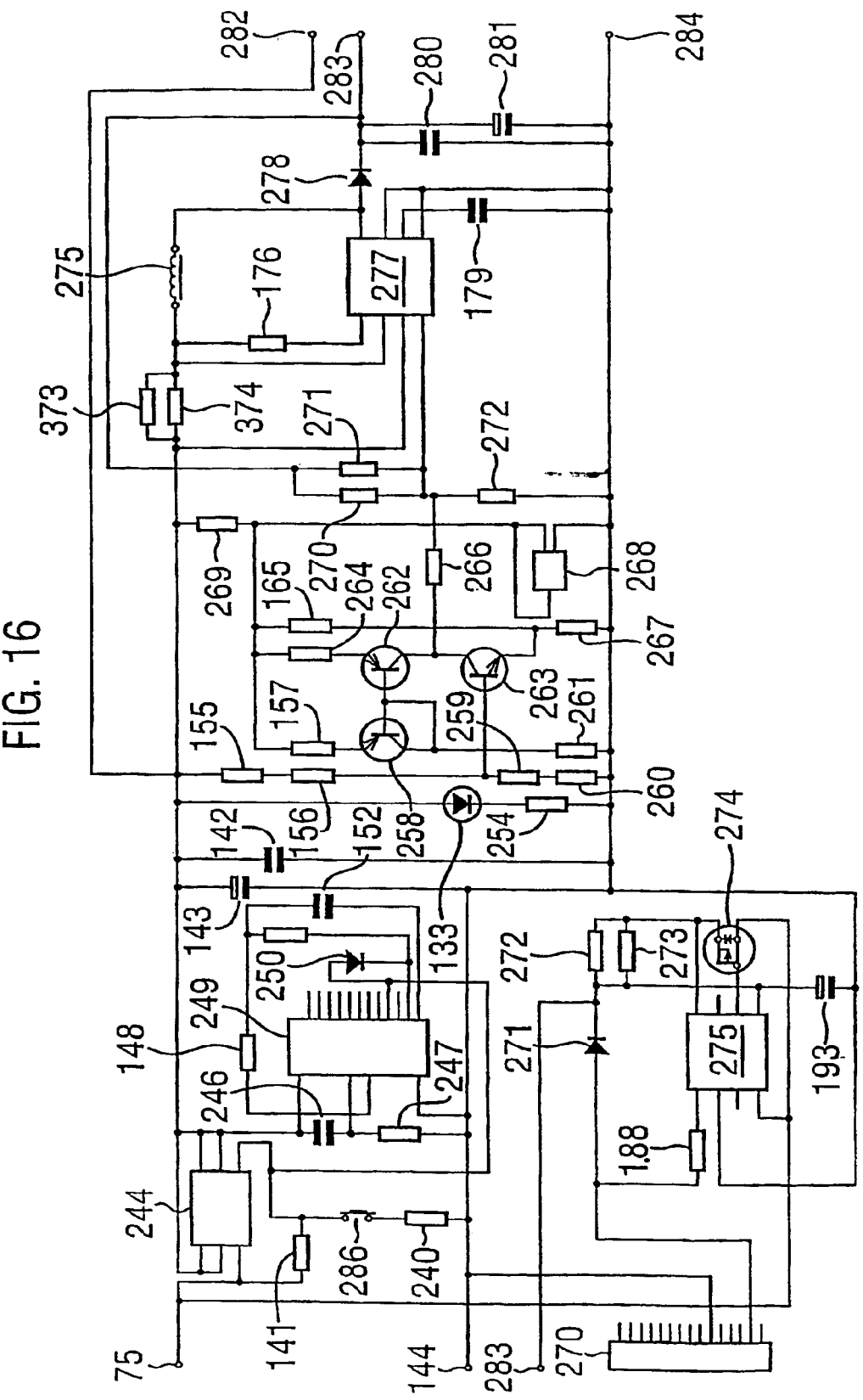
FIG. 16 is a block diagram of a control circuit housed in the detachable unit, which will hereinafter be referred to in the specific description as a pod.

Turning now to FIG. 16 of the accompanying drawings, this is a circuit diagram of the circuitry carried by the detachable pod.

As already mentioned it is possible to charge the battery from the original cell phone charger. This can be done via a standard socket 270 to which the output of the original cell phone charger is connected. When the battery 124 is charged from the original cell phone charger the latter is connected to socket 270 and the current flows a path from pin 14 of socket 270 via diode 271, resistors 272 and 273, the source and drain of transistor 274, pad 275, pads 76 and 77 of the circuit of FIG. 6, pad 149, the battery 124, pad 150, earth pads 80, and finally pad 244 to pin 10 of connector 270. The transistor 274 is controlled by pin 3 of integrated control circuit 275.

Current also flows from diode 271 to pad 283 and then to pads 78 and 79 of the FIG. 15 circuit. From there the current flows via resistor 161, pad 162, LED 125, pad 163 to earth. The LED 125 glows to show that the unit is under charge conditions. The diode 271 is used for polarity protection and resistors 272 and 273 set the charging current. The integrated circuit 175 also monitors the battery voltage at pin 5 to ensure that when the battery is fully charged, the current drops to a very low value.

The timer and regulator operation of the circuit on the pod is as follows. The switch 286 starts the charging cycle by turning transistor 244 on. In the present embodiment transistor 244 is a MOSFET transistor. Power is accordingly supplied to pin 16 of integrated circuit 249 and capacitor 246 and resistor 247 resets the timer by giving a high pulse to circuit 249. Pin 2 of circuit 249 goes low and holds the transistor 244 on. Current also flows through LED 133 and resistor 254 to show "an on" condition.

Power is also applied to the dc-dc switch mode converter 277 which provides a higher output voltage with a very rapid switching action. When the internal switch inside converter 277 is on current flows from pad 240, outputs 5 and 6 of circuit 244, resistors 273 and 274, coil 275, output 1 of integrated circuit 277, output 2 of the same circuit to pad 284. When the internal switch turns off the magnetic field in coil 275 decreases causing a voltage across itself. The supply voltage is therefore in series with this voltage. The current flows from pad 240, transistor 244, resistors 373 and 374, coil 275, diode 278, pad 283, via the cell phone back to pad 284. The current also charges capacitor 281. The internal switch of converter 277 turns on again and the cycle is repeated. This happens thousands of times per second. Since the voltage across the coil 275 is in series with the supply voltage, the output voltage is higher than the battery voltage.

The output voltage at pad 283 is fed back to converter 277 to input 5 of the latter via resistors 270, 271 and 272 and the output will change so that the voltage at 5 of converter 277 is always 1.25V. Therefore the ratio of resistors 270/271 and 272 effectively sets the output voltage if the effect of resistor 266 is ignored.

The voltage back from the cell phone being charged which appears at pad 282 modifies the output voltage as follows. The following table sets out three cases. Before discussing each of the cases individually the voltage at the junction of resistor 269 and resistor 164 is held constant at 2.5V by shunt regulator 268. A current flows via resistor 269, resistor 257, transistor 258 and resistor 261 to earth. Since the voltage at the top of resistor 257 is constant, then this current is also constant. Since the voltage at the base of transistor 258 is constant, the voltage at the base of transistor 262 is also constant and therefore the current flow via resistor 264, transistor 262, emitter to collector is exactly the same as that through resistor 257. This current then splits through transistor 263, resistor 267 to earth or resistor 261 to pin 5 of converter 277. The voltage at pad 282 determines the proportion of this current split.

The three cases set out in the table will now be discussed in greater detail.

Case 1—The voltage at pad 282 is too low to turn transistor 263 on. All the current from the collector of one of transistor 262 flow through resistor 266 via resistor 272 to earth. The output voltage is thus fixed at 4.4V.

Case 2—The voltage at pad 282 starts to turn on transistor 263. This reduces the current through the resistor 266. The voltage at pin 5 of converter 277 will therefore try to decrease. The output voltage at pad 283 will increase to maintain pin 5 of converter 277 at 1.25V.

Case 3—The voltage at pad 282 has turned transistor 263 fully on. The current through the transistor is at a maximum value and cannot increase further. The current through resistor 266 cannot decrease further and therefore it has no effect on the output voltage.

At the end of the timing cycle pin 2 of circuit 249 goes high and stops the timer by putting a high voltage via the diode 250 to pin 10. It also removes drive from transistor 244 and thereby switches it off. The voltage on the output of transistor 244 goes to zero.

In the present embodiment the voltage across resistors 373 and 374 is detected by converter 277 and used as a measure of the current flowing to the output. If there is too much current flowing then converter 277 will "current limit" to prevent excessive heat and/or the circuit from being operated outside its parameters.

Resistors 257 and 264 are fitted to minimise differences between the emitter base voltages of transistors 258 and 262 having an effect on the accuracy of the "current mirror". Capacitors 280 and 281 are used to smooth the dc output.

Turning now to FIG. 17 of the accompanying drawings, this shows a torch having an external casing 201 carrying a folding crank arm 202. The crank arm 202 has a free end indicated at 203 and its other end is pivotally connected at 404 to a crank 405. As can be seen from FIG. 18 the pivot 404 enables the crank arm to be pivoted through substantially 180° and has mounted on its free end a small rubberised handle 406. When the crank arm is stowed in its inoperative position the handle sits in a socket 407. The main casing 401 is configured so that it can easily be held in one hand by a user so that the crank mechanism can be operated by the user's other hand.

For ease of assembly the casing 401 is manufactured in two parts namely a top casing 408 and bottom casing 409. The two casing halves are connected by bolts (not shown) passing through cylindrical protrusions 410 and 411 which also act to locate the top casing with respect to the lower casing when they are assembled together.

As in the previous embodiments the length of the crank arm is designed to optimise power input for a particular input speed and the crank 405 itself is mounted on a low friction bearing.

The crank arm 402 is connected directly to an input gear 15 which transfers the relatively low speed rotation from the crank mechanism to an intermediate gear 16 and thence to an alternator 20. The gear arrangement and the structure of the alternator are similar to that of the other embodiment and so will not be described again.

Figure 19:
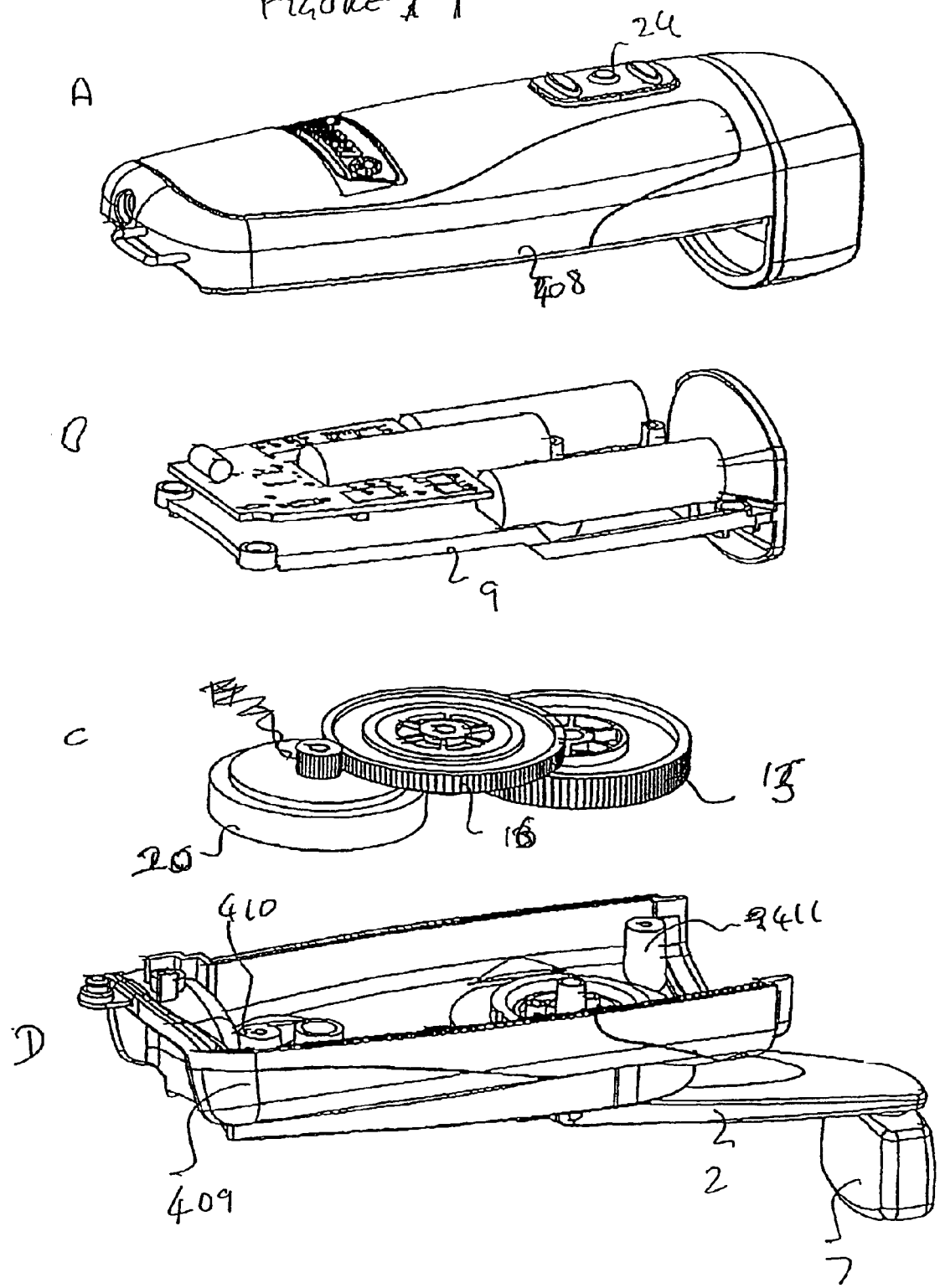

As can be seen from FIG. 19 the two casing halves 408 and 409 are bolted together on either side of a central, substantially planar, unit 421. This unit 421 carries a circuit board 422 and also has mounting 423 for one or more batteries which are preferably of the lithium ion or lithium polymer type. The upper casing half 408 carries a switch 424 by means of which a user can turn the flashlight on and select either high or low output filaments from a two-filament bulb (not shown) mounted in a standard reflective casing 425. The flashlight also has a socket 426 from which the battery/batteries can be charged from an external power supply and a light, preferably an LED 427, the purpose of which will be described hereinafter.

The operation of the circuitry of the circuit board 422 will now be described in relation to FIG. 20 of the accompanying drawings.

The three-phase output of the alternator is connected via pads 428, 429, 430 to a rectifier module consisting of diodes 431, 432, 433, 434, 435 and 436 so as to charge a battery 437.

An "effort indicator" circuit comprises a programmable reference device 438 and a transistor 439 with associated resistors 440, 441, 442, 443 and 444 which monitors the alternator output and lights up the LED 427 when there is meaningful output from the alternator.

The output of the alternator can also be used to drive the filaments of the two-filament bulb indicated at 445 and a low drop out regulator circuit is used to limit the voltage which can be supplied to the bulb 445 from the alternator to 3.3. volts. Naturally other voltages might be used for different types of bulbs.

The low drop out regulator circuit comprises a comparator 446 and a pair of transistors 447, 448. The reference voltage used by comparator 446 can be trimmed using resistors 480 and 481 to take component tolerances into account.

Power to the bulb 445 is controlled by the switch 424 which is a three-position switch shown in the "OFF" state. One pair of terminals connect to the high power filament of the bulb 445 when bright light is required and the other pair connects power to the low power filament when power conservation is required.

In this embodiment the battery 437 can be charged from an external source via a socket 456, via a diode 457 and resistors 458 and 459.

The diode 457 is used for polarity protection and the resistors 458 and 459 to set the charging current drawn from the external adaptor. Resistors 458 and 459 also limit the charging current if the bulb is on and the battery is flat.

When the battery 437 is being charged by the alternator current flows via diodes 432, 434 and 436 and contact pad 470 to the battery 437 and then back via a contact pad 476 and a resistor 463 to diodes 431, 433 and 435.

As mentioned the circuit includes an effort indicator to show a user that the alternator is providing a meaningful output. In the effort indicator circuit power from the alternator is taken via pad 428 and a half-wave rectifier diode 464. This power is smoothed by a capacitor 465.

The programmable reference circuit 238 will try to divert the current from diode 464, resistor 442, and its terminal to ground when the voltage across capacitor 65 exceeds a preset voltage. This preset voltage is set by the ratio between resistors 440 and 441, the junction of which is connected to the reference input of reference device 438. Current will also be diverted via the emitter and base of transistor 439, resistor 443 to reference circuit 438. Thus transistor 439 will switch on so that current flows from the emitter of transistor 39, its collector, pad 460, LED 427, pad 461 and resistor 444 to ground so that the LED 427 will illuminate to show optimum input. The final main circuit is the main regulator circuit for the bulb. This circuit includes operational amplifier 446 which compares the voltage of the output across capacitor 466 via resistors 467 and 468 with a reference voltage at pad 469. The output of the operational amplifier 446 drives transistor 447 via transistor 448 so that the output voltage is kept constant.

When the torch is switched on then current flows from battery 237, positive pad 470, pad 471, switch 424, pad 472 through the emitter and collector of transistor 447, pad 473, pad 474, bulb 445, pad 475, and pad 476 to the negative terminal of the battery 437.

Current also flows via resistor 449 and programmable precision reference circuit 477 to ground to provide a reference voltage at pins 1 and 3 of the precision reference circuit 477. This voltage is divided in half by resistors 428 and 479 and this voltage is applied via pad 469 to the minus input of operational amplifier 446. To allow for tolerances in the reference voltage, a facility is provided to adjust the voltage slightly up or down by means of strapping pad 469 to either resistor 480 or resistor 481 via respective pads 482,483. Stability for the precision reference circuit 477 is provided by means of capacitor 484.

If the output across capacitor 466 is lower than desired then the voltage at the junction of resistors 467 and 468 will also be lower. Thus the voltage at the plus input of the operational amplifier 446 will be lower than that at its minus input. The output voltage of the operational amplifier 446 will therefore decrease. Current flow will increase from emitter and base of transistor 447, emitter and base of transistor 48 to the output of the operational amplifier 446.

Current flow will consequently increase from the emitter and base of transistor 447, emitter and collector of transistor 448 via resistor 52 to ground. This increase in current through emitter and base of transistor 447 will therefore turn it on to a greater degree. The voltage across capacitor 466 will increase until the voltage on both inputs of the operational amplifier 446 are the same.

If the output across capacitor 466 is higher than desired, then the voltage at the junction of resistors 467 and 468 will also be higher. Thus the voltage at the plus input of the operational amplifier 446 will be higher than that at its minus input. The output voltage of the operational amplifier 446 will therefore increase. Current flow will therefore decrease from the emitter and base of transistor 447, emitter and base of transistor 448 and resistor 451 to the output of the operational amplifier 446. Current flow will consequently decrease from the emitter and base of transistor 447, emitter and collector of transistor 448 and resistor 452 to ground. This decrease in current through the emitter and base of transistor 447 will therefore turn it on to a lesser degree. The voltage across capacitor 466 will decrease until the voltage on both inputs of the operational amplifier 446 are the same. Resistor 450 is present in order to switch transistor 447 off if the output of operational amplifier 446 is high.

From the above it will be appreciated that switch 24 can connect the battery from the regulator circuit and selects either normal and high filaments of the lamp in accordance with whether pads 471/472 and 473/474 are contacted or pads 471/485 and 473/486.

From the above description it will be seen that a simple circuit is provided which enables a carefully regulated voltage to be supplied to the bulb either from the alternator if the battery is flat or from the battery. Additionally the battery can be charged from the alternator input or from an external power supply. The resulting flashlight is both compact, easy to handle and highly efficient.

Referring now to FIG. 21 it will be appreciated that a discussion has already been given with regard to the importance of reducing the cogging effect when the generator is initially started. In order to reduce the cogging effect both the stator laminations and the permanent magnets were skewed. It has now been found that the performance of the stator can be improved by not using identical laminations each of which is angularly displaced with respect to its neighbour. In the FIG. 21 embodiment the requisite skewing effect of the stator teeth is provided by varying each lamination and specifically by varying the teeth of the laminations which are shown at 501. It will be seen that each tooth 501 extends on either side of its stator arm with the anti-clockwise extension of the teeth of the uppermost lamination being substantially longer than the clockwise hand extension. The skewed effect is obtained by progressively reducing the anti-clockwise extensions and progressively increasing the clockwise extensions. This arrangement enables the copper windings around the arms 500 of the stator to be more effective as the cross-sections of the actual arms 502 are not skewed so that it is no longer necessary to skew the alternator rotor magnets. In the FIG. 21 variant there is a central lamination with three pairs of different laminations, the laminations above the control lamination being inverted with respect to the laminations below the central lamination.

FIGS. 22 to 24 are all examples of specific control circuits designed to be associated with particular mobile phones. All these four circuits had centrally the same basic components which comprise a series of inputs indicated at 400 for receiving charge either from the battery in the main housing or from the standard charger provided with the mobile phone. Section 401 is used to ensure that if there is an error in the voltage supplied at the input side or the phone attempts to draw too much power through the circuit that the phone and/or the charger unit is suitably protected. Section 402 actually deals with the over drive trip and section 403 tracks phone power usage and provides appropriate compensation. Section 404 actually converts the supplied voltage into the appropriate format for the phone and sections 405 and 406 are respectively a power stage and an external current/limit, output enable circuit. The embodiment of FIG. 23 is a simplified version of the embodiment of FIG. 22 and accordingly only has the sections 400, 401, 402 and 405. The circuit of FIG. 24 has only minor alterations with regard to the circuit shown in FIG. 22. All of the components of these circuits are conventional.

What is claimed is:

1. A handheld power generator for generating electrical power for a consumer device, the generator comprising a main casing housing an input gear for driving an alternator via at least one intermediate gear so as to provide a step-up drive ratio in the range of 10:50;

the input gear, intermediate gear, and the rotor of the alternator all having their rotational axes perpendicular to the base of the main casing so that the gears and rotor rotate parallel to the plane of the base;

a rectifier circuit to the alternator for rectifying the alternator output;

means for mounting a storage device for storing the output of the alternator;

a control circuit for modifying the rectifier output to a voltage/current appropriate for the consumer device, and wherein the input gear is connected to a drive member rotatable by manual action to rotate the input gear in turn, the axis of the drive member being parallel to the respective axes of the input gear, the or each intermediate gear and the rotor with all the axes lying in a single straight line.

2. A generator according to claim 1, wherein the crank arm position, as at free and extending transversely from the crank arm and is adapted to pivot through approximately 180° from its stored position into its operative position, and the length is greater in the operative position than in the stored and wherein the main casing is provided with a recess in which the handle fits only when the crank arm is in its shortest state.

3. A generator according to claim 1, wherein said drive member comprises a bobbin coupled via a uni-directional clutch to the input gear and having mounted thereon a pull-cord by means of which the bobbin can be rotated to impart drive to the input gear so as to drive the alternator to generate current, and including a spring biasing the bobbin to the condition in which the draw-cord is stored around the bobbin.

4. A handheld power generator for generating electrical power for a consumer device, the generator comprising a main casing housing an input gear for driving the rotor of an alternator via at least one intermediate gear so as to provide a step-up drive ratio in the range of 10:50, the input gear, intermediate gear, and the rotor of the alternator all having their rotational axes perpendicular to the base of the main casing so that the gears and rotor rotate parallel to the plane of the base, the alternator comprising an alternator rotor housing an array of magnets and rotatable with respect to a stator, the stator having a plurality of teeth formed from a plurality of laminations;

a rectifier circuit connected to the alternator for rectifying the alternator output;

means for mounting a battery for storing the output of the alternator; and a control circuit for modifying the rectifier output of the alternator; and a drive member connected to said input gear and rotatable by manual action to rotate the input gear, the axis of rotation of the drive member being parallel to the respective axes of the input gear, the intermediate gear and the rotor with all the axes lying in a single straight line, and wherein one end of the drive members is pivotally connected to one end of a crank arm which is movable into an operative position from a stored position in which it lies parallel to the base of the casing which with its free end held in a recess in the other end of the casing, the longitudinal axis of the crank arm in its stored position lying orthogonally across the axes of rotation of the gears and the alternator.

5. A generator according to claim 4 wherein the stator teeth are skewed with respect to the rotation axis of the alternator so as to reduce cogging effects.

6. A generator according to claim 4, wherein the stator laminations each have a plurality of identical stator arms which are aligned with each other, the arms of each stator lamination providing a tooth portion transverse to the arm, the tooth portion of each stator lamination being different from to the tooth portions of the other stator laminations of each arm so that the teeth of the stator formed by the tooth portions are skewed but the stator arms are not.

7. A generator according to claim 6, wherein the alternator rotor is axially located only by the magnetic field associated with the magnetic circuit formed by the stator and the alternator magnets.

8. A handheld power generator for generating electrical power for a consumer device, the generator comprising a main casing housing an input gear for driving the rotor of an alternator via at least one intermediate gear so as to provide a step-up drive ratio in the range of 10:50, the input gear, intermediate gear, and the rotor of the alternator all having their rotational axes perpendicular to the base of the main casing so that the gears and rotor rotate parallel to the plane of the base, the alternator comprising an alternator rotor housing an array of magnets and rotatable with respect to a stator, the stator having a plurality of teeth formed from a plurality of laminations;

a rectifier circuit connected to the alternator for rectifying the alternator output;

means for mounting a battery for storing the output of the alternator; and a control circuit for modifying the rectifier output of the alternator; and a drive member connected to said input gear and rotatable by manual action to rotate the input gear, the axis of rotation of the drive member being parallel to the respective axes of the input gear, the intermediate gear and the rotor with all the axes lying in a single straight line, and wherein one end of the drive members is pivotally connected to one end of a crank arm which is movable into an operative position from a stored position in which it lies parallel to the base of the casing which with its free end held in a recess in the other end of the casing, the longitudinal axis of the crank arm in its stored position lying orthogonally across the axes of rotation of the gears and the alternator;

and the main body having an output socket for attachment to a detachable unit containing circuitry for adapting the output of the power generator to a particular model of cell phone.

9. A generator according to claim 8 in combination with a detachable unit in the form of a pod containing circuitry for adapting the output of the power generator to a particular model of cell phone.

10. A generator according to claim 9 wherein the means for mounting a storage device are adapted to mount a battery so that the be charged by the output of the alternator whereby when charged the battery can provide power via the detachable unit to a cell phone, and wherein the detachable unit has a socket adapted to co-operate with the output of a cell phone charger so that a battery mounted in the main body can be charged via a cell phone charger.

11. A handheld power generator for generating electrical power for a consumer device, the generator comprising a main casing housing an input gear for driving an alternator via at least one intermediate gear so as to provide a step-up drive ratio in the range of 10:50, means for mounting a bulb so that the generator/bulb combination can act as a flashlight and wherein the generator further comprises a battery mounting in which a battery can be mounted so that when mounted the battery can power a mounted bulb, and a switch whereby the battery or the alternator can either power the bulb or the alternator charge the battery, and for switching power to the bulb mounting so that a mounted bulb can operate in either a bright, high power consumption mode or a less bright, lower power mode.

* * * * *

UNITED STATES PATENT AND TRADEMARK OFFICE
CERTIFICATE OF CORRECTION

PATENT NO. : 6,914,340 B2
DATED : July 5, 2005
INVENTOR(S) : Pierre Becker et al.

It is certified that error appears in the above-identified patent and that said Letters Patent is hereby corrected as shown below:

Title page,
Item [73], Assignee, replace "Freeplay Market Development, London, (GB)" with -- Freeplay Market Development Limited, London (GB) --.

Column 12,
Line 38, insert -- connected -- in between "circuit" and "to".
Line 41, insert -- and -- after "alternator;".
Lines 44-49, replace "and wherein the input gear is connected to a drive member rotatable by manual action to rotate the input gear in turn, the axis of the drive member being parallel to the respective axes of the input gear, the or each intermediate gear and the rotor with all the axes lying in a single straight line." with -- and a drive member connected to said input gear and rotatable by manual action to rotate the input gear, the axis of rotation of the drive member being parallel to the respective axes of the input gear, the intermediate gear and the rotor with all the axes lying in a single line, and wherein one end of the drive member is pivotally connected to one end of a crank arm which is movable into an operation position from a stored position in which it lies parallel to the base of the casing which with its free end held in a recess in the other end of the casing, the longitudinal axis of the crank arm in its stored position lying orthogonally across the axes of rotation of the gears and the alternator. --.
Line 51, insert -- its -- between "at" and "free".
Line 51, replace "and" with -- end --.
Line 51, remove "the" after "from".

Column 14,
Line 34, insert -- battery can -- between "the" and "be".

Signed and Sealed this

Twenty-first Day of March, 2006

JON W. DUDAS
*Director of the United States Patent and Trademark Office*